Feb. 18, 1964  R. F. SEARLE ETAL  3,121,374
PROCESS AND MACHINE FOR MANUFACTURING PAPER BAGS
Filed June 15, 1962  15 Sheets-Sheet 1

INVENTORS.
ROBERT F. SEARLE,
PAUL C. ROBINSON &
BY WILLIAM A. JOHNSON

*Eyre, Mann + Lucas*
ATTORNEYS.

Feb. 18, 1964 R. F. SEARLE ETAL 3,121,374
PROCESS AND MACHINE FOR MANUFACTURING PAPER BAGS
Filed June 15, 1962 15 Sheets-Sheet 3

INVENTORS.
ROBERT F. SEARLE,
PAUL C. ROBINSON &
BY WILLIAM A. JOHNSON

ATTORNEYS.

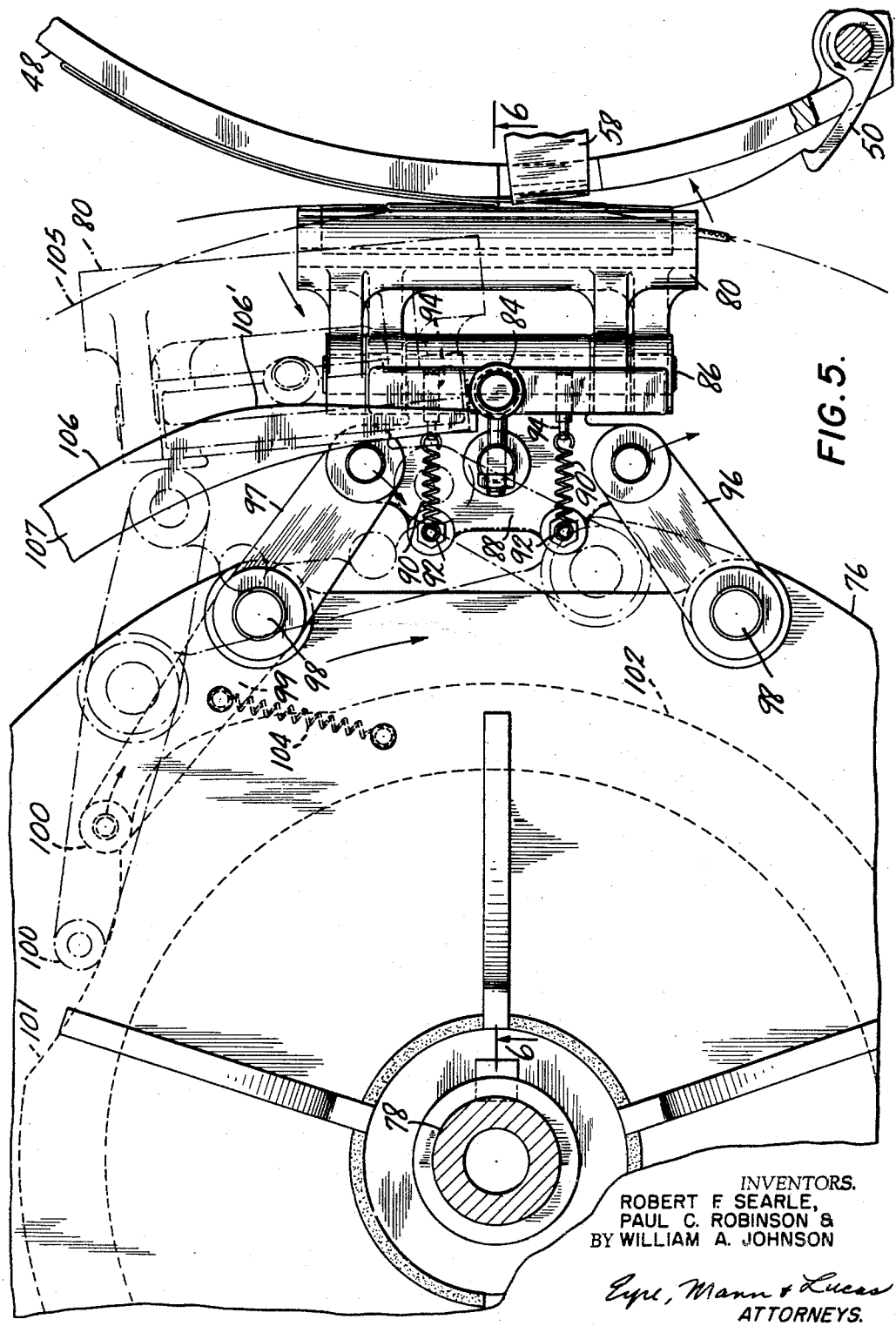

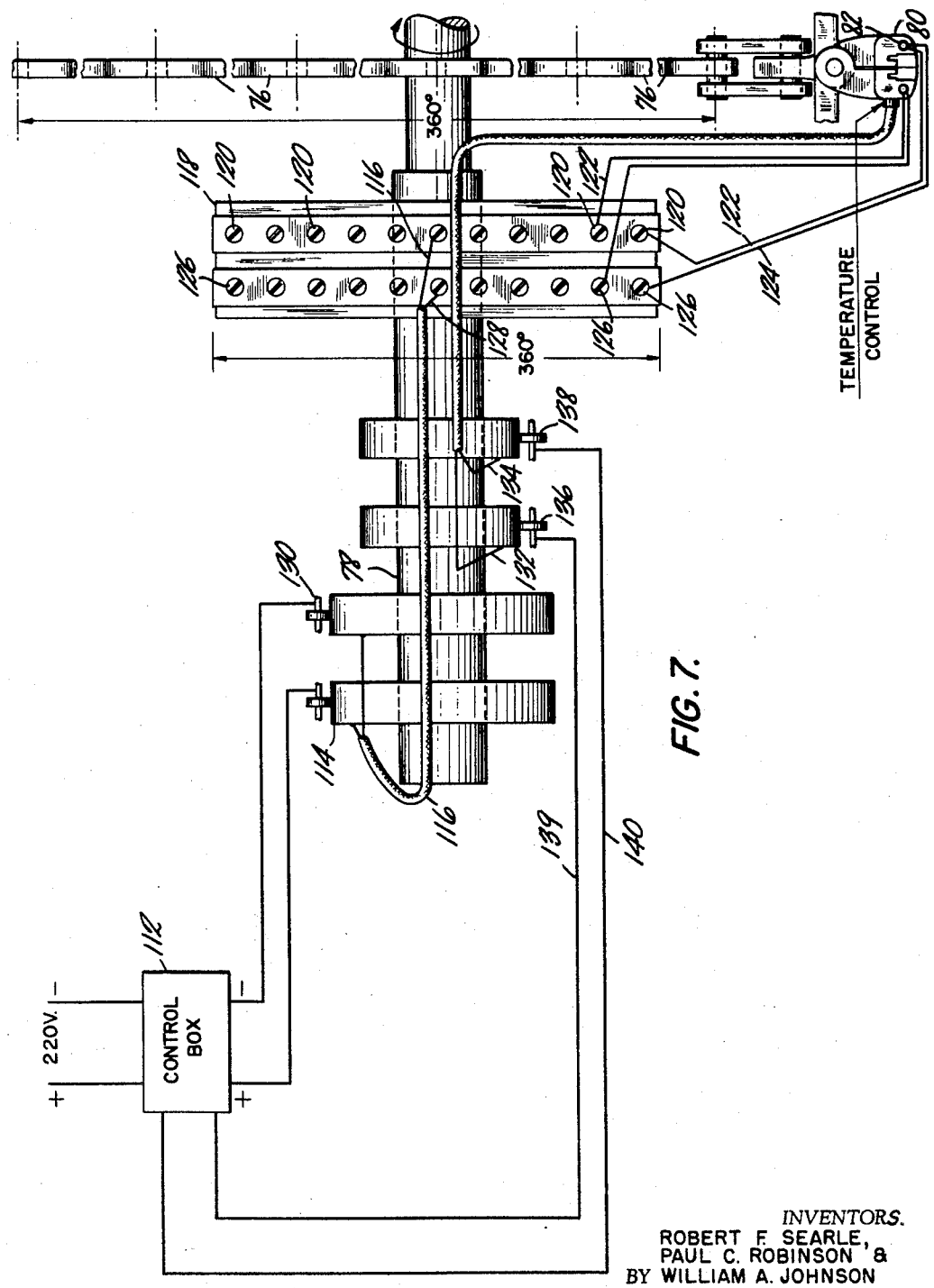

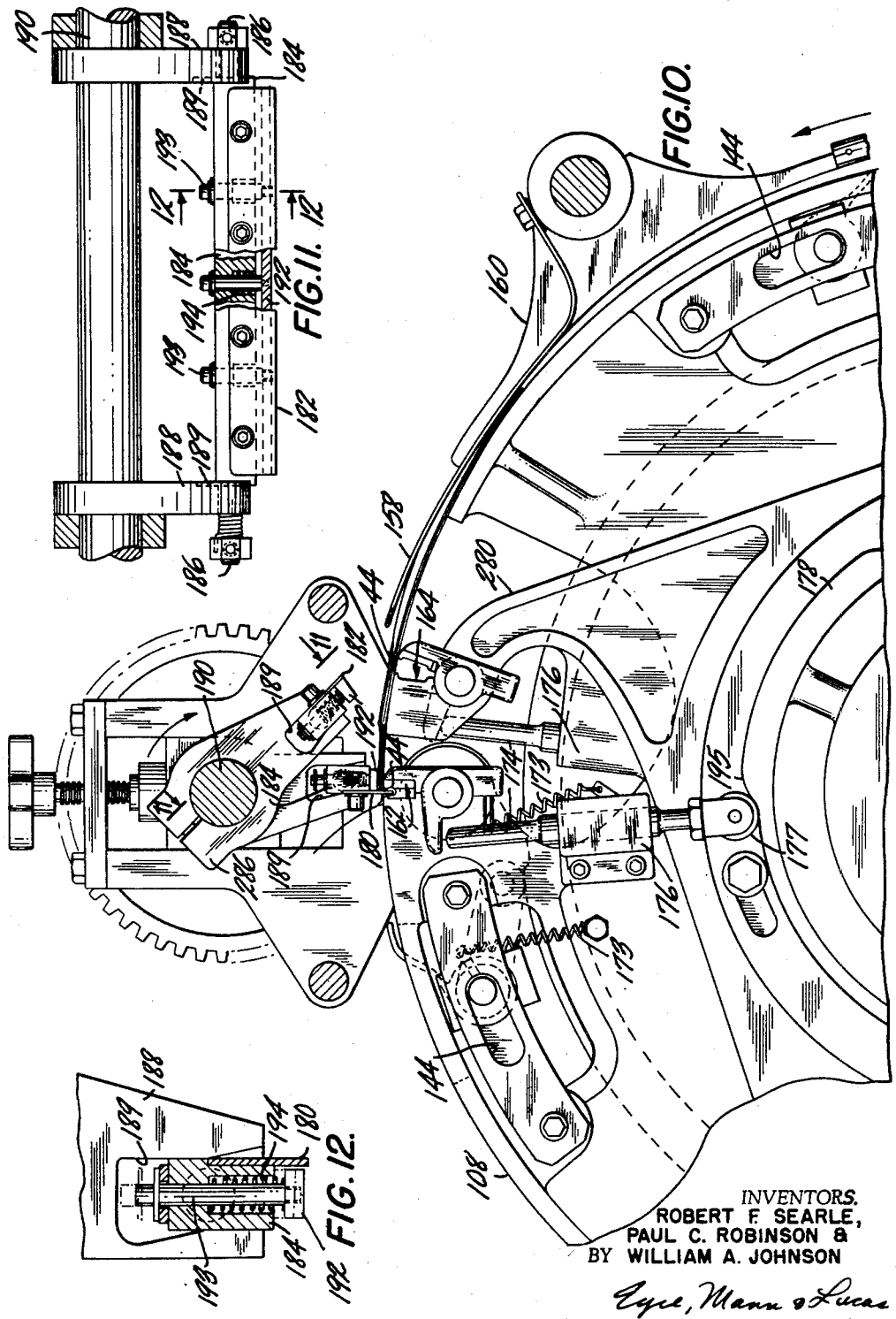

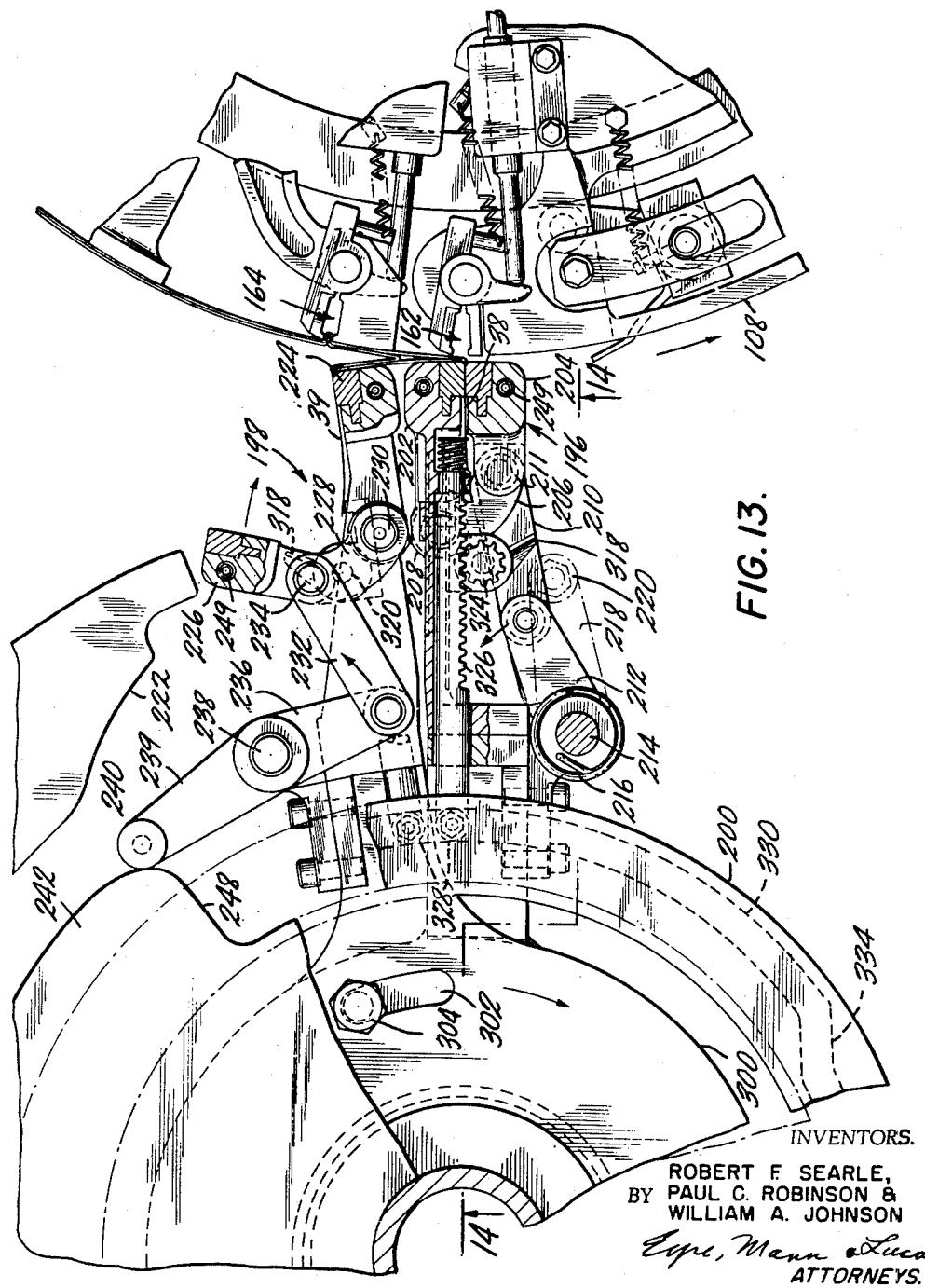

FIG. 14.

Feb. 18, 1964    R. F. SEARLE ETAL    3,121,374
PROCESS AND MACHINE FOR MANUFACTURING PAPER BAGS
Filed June 15, 1962    15 Sheets-Sheet 12

INVENTORS.
ROBERT F. SEARLE,
PAUL C. ROBINSON &
BY WILLIAM A. JOHNSON

ATTORNEYS.

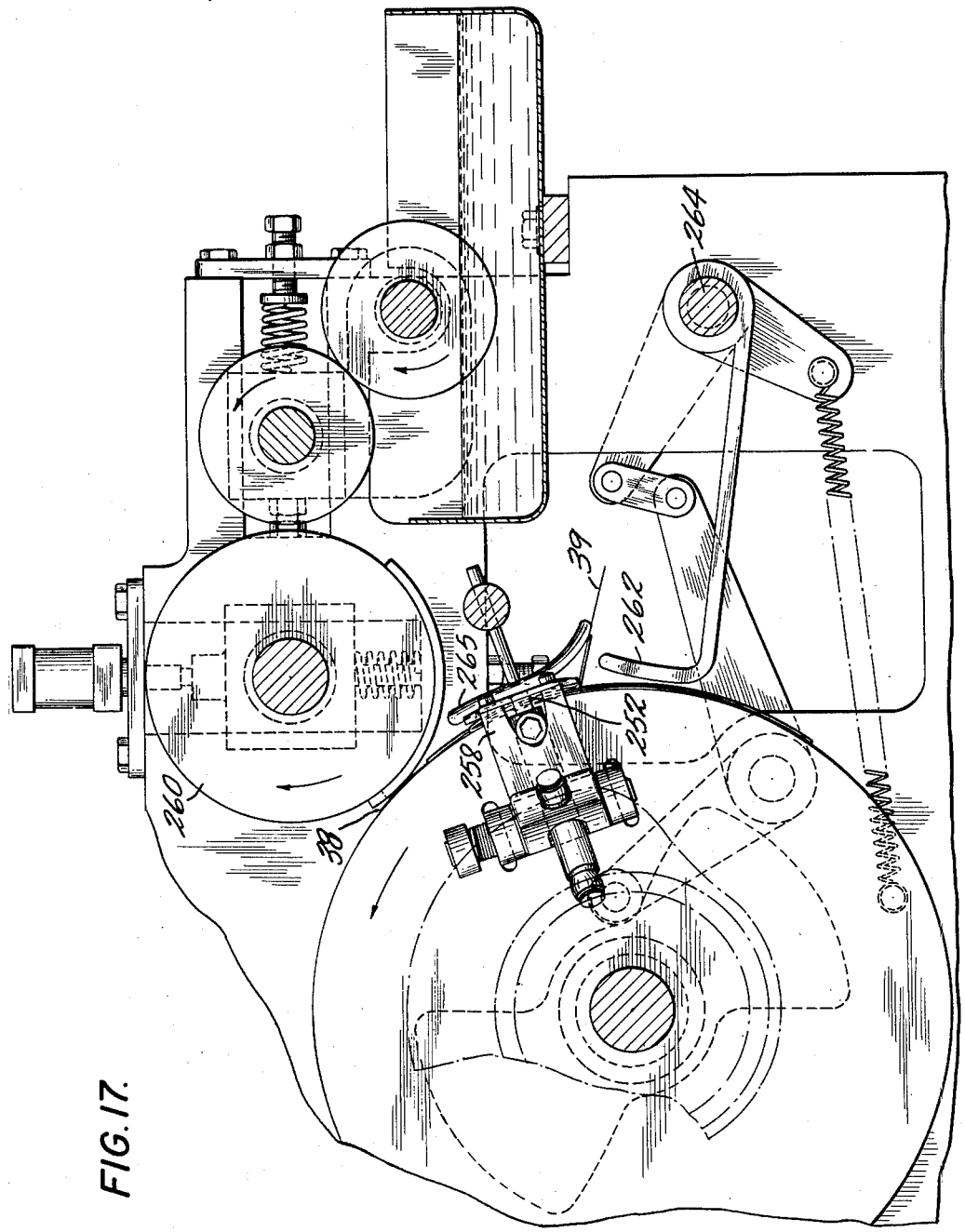

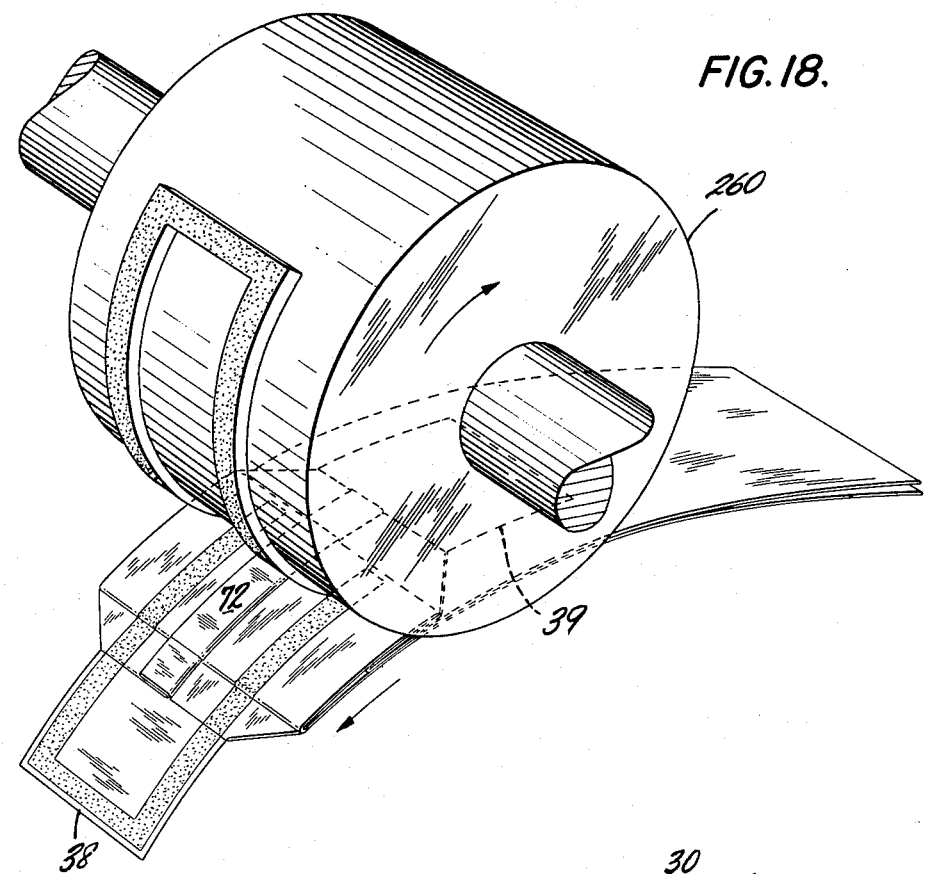
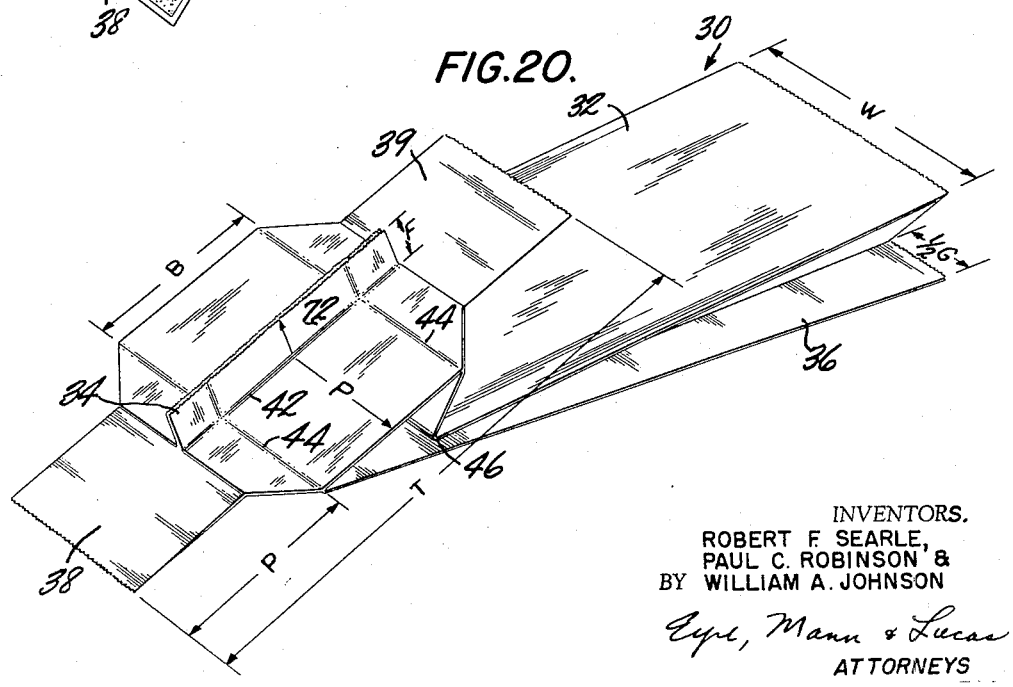

United States Patent Office 3,121,374
Patented Feb. 18, 1964

3,121,374
PROCESS AND MACHINE FOR MANUFACTURING PAPER BAGS
Robert F. Searle and Paul C. Robinson, Glens Falls, N.Y., and William A. Johnson, Rutland, Vt., assignors to Arkell and Smiths, a corporation of New York
Filed June 15, 1962, Ser. No. 202,912
20 Claims. (Cl. 93—22)

This invention relates to a process and apparatus adapted for use in heat sealing the end closure of a paper bag provided with thermal plastic liner. In accordance with the present invention one end portion of a conventional bag tube with thermal plastic liner is opened into the form of an open box while one side of the box is held depressed so that the box may be advanced to cause a plow blade member to enter into the interior of the open box. The upright opposite side walls of the box are then collapsed downwardly in against the plow blade and folded so as to form an upstanding longitudinal fin running along the length of the enclosure. Thereafter, the bag is moved away from the plow blade and the upstanding fin is gripped by a pair of heat sealing jaws which apply heat and pressure to fuse adjacent portions of the thermal plastic liner in the fin. Following this operation, portions of the partially completed end closure of the bag tube are tucked down in between clamping jaws which force the end flaps in the end closure to stand upright. Thereupon the upright end flaps are each gripped by a pair of heat sealing jaws which apply heat and pressure to seal the thermal plastic liner in the flaps of the end closure. By sealing the thermal plastic liner in the fin and by providing cross seals in the end flaps of the closure, a complete seal of thermal plastic liner is achieved in the end closure of the bag to make it sift proof and prevent loss of finely divided material. The bag is completed by folding down the end flaps which are then pasted into the end closure of the bag. The pasted end flaps reinforce the heat seals of thermoplastic material in the end closure of the bag to strengthen the end closure which might otherwise fail under the weight of the packaged material. The apparatus of the present invention has great versatility and only very minor adjustments need be made in order to accommodate different size bag tubes. Details of the process and the details of a preferred form of apparatus for carrying out the process may be readily understood by reference to the drawings in which:

FIG. 5 is a side view of one of the heat sealing jaw members of the apparatus of FIG. 1.

FIG. 7 illustrates one preferred way of supplying electric current to the heat sealing jaw members of FIG. 5.

FIG. 10 illustrates apparatus used for tucking a portion of the bag tube down in between gripping jaws carried by the transfer drum of FIG. 8.

FIG. 11 is taken on line 11—11 of FIG. 10.

FIG. 12 is taken on line 12—12 of FIG. 11.

FIG. 13 illustrates the heat sealing jaws for sealing the thermoplastic liner in the end flaps of the bag.

FIG. 14 illustrates the details of the cutting blades associated with the heat sealing jaws for the end flaps.

FIG. 17 illustrates the details of apparatus employed for pasting down the end flaps of the bag tube.

FIG. 18 illustrates the roll which applies paste to the heat sealed end flaps.

FIG. 20 illustrates the arrangement of the heat seals in the end closure of the bag.

Figure 1:
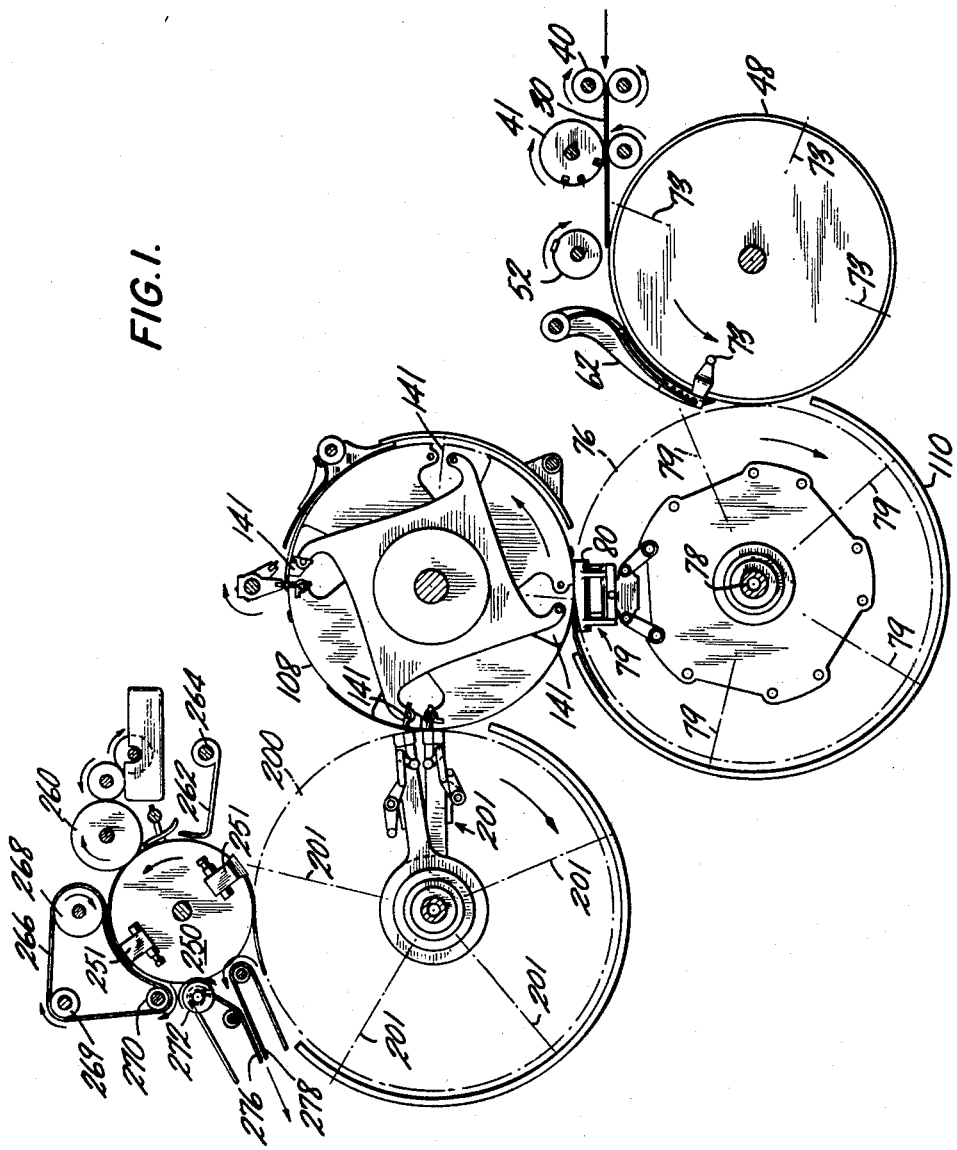
FIG. 1 is a side view of a preferred form of apparatus for carrying out the process of the present invention.

Turning now to FIGS. 1 and 20 of the drawings, 30 is a gusseted bag tube with an exterior paper ply 32 and an internal thermoplastic liner 34 which is glued to the paper ply. The tube has the usual gussets 36 and the usual longitudinal seam (not shown). One end portion of the bag tube is slit to form conventional end flaps 38 and 39 customarily employed in the so-called self opening square (SOS) type of bag. Such paper bag tubes with thermoplastic liner are conventional and well known in the art and the tube may be made in any desired manner. We prefer to heat seal the thermoplastic liner along the line of the seam in such manner as to form an inner tube of plastic material and in such case opposite edge portions of the paper ply are separately glued along the line of the seam to form an outer paper tube. This procedure for forming a separate inner and separate outer tube is described in United States Patent No. 2,875,673. Other conventional means may of course be employed for forming the seam in the bag tube.

In accordance with the present invention one end portion of the bag tube is opened and folded into the form of an open box and a portion of one side wall of the box is held depressed so that when the bag tube is advanced a stationary plow member may be caused to enter into the interior of the box. Thereafter, the box is collapsed and opposite side walls of the box are folded in against the plow member to form an upright longitudinal fin extending along a line approximately parallel to the seam of the tube.

In forming the longitudinal fin, a bag tube 30 is fed through advancing rolls 40 (FIG. 1) which feed the tube through a pair of conventional score rolls 41 which position three score lines 42, 44 and 46 (FIG. 20) across the width of the bag tube. These score lines are not essential but they do assist in folding the plies to form the end closure.

Figure 2:
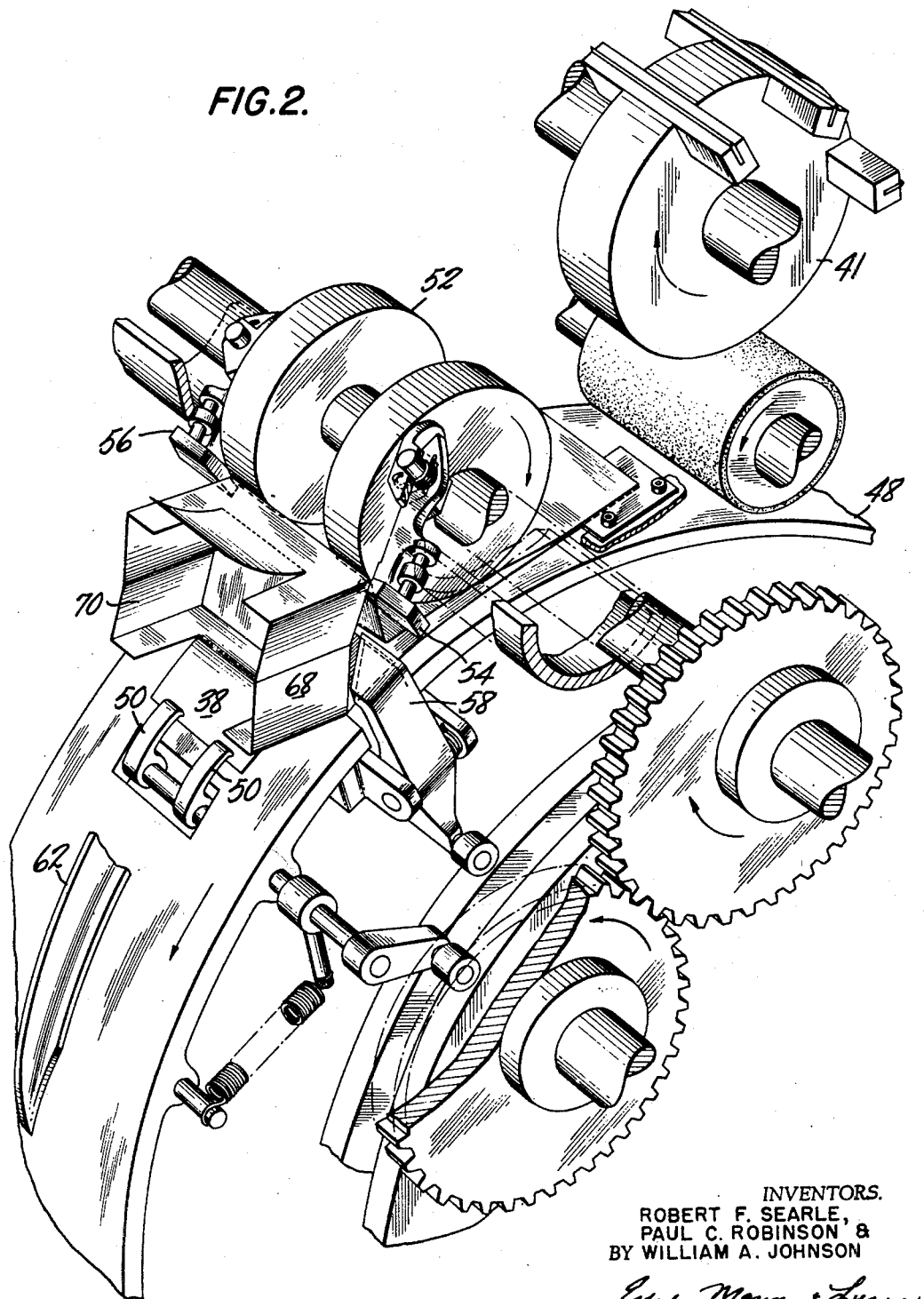
FIG. 2 is a perspective illustration of that portion of the apparatus of FIG. 1 which is employed for forming a box in one end of a bag tube.
Figure 3:
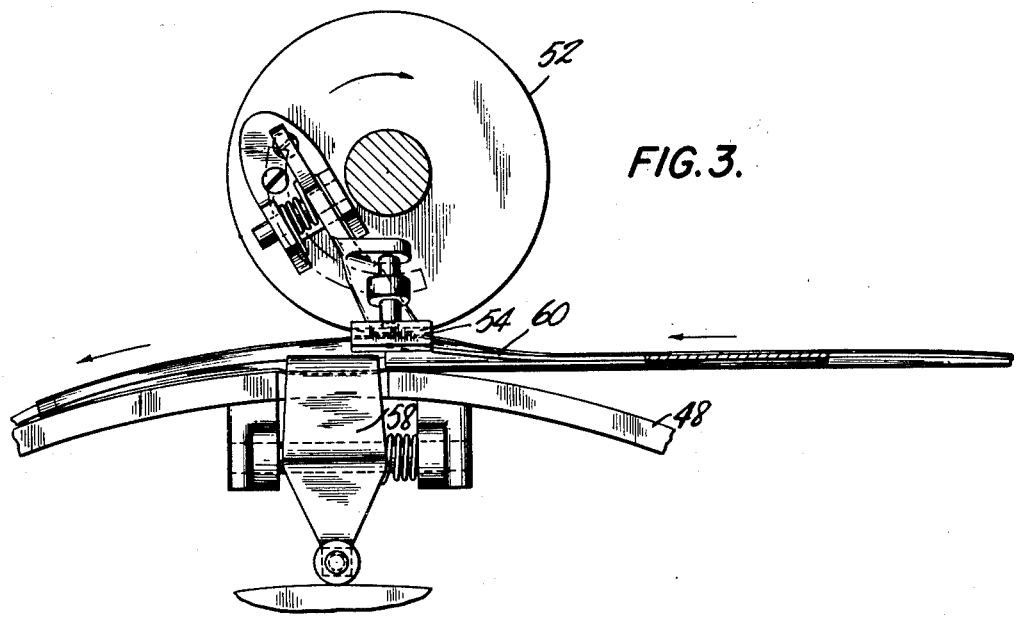
FIG. 3 is a side view of the apparatus employed for forming the open box in one end of the bag tube.

The scoring rolls feed the leading edge of the bag tube against a rotating drum 48 which carries a pair of movable fingers 50 (FIG. 2) which grip the leading edge of the end flap 38 in the bottom side wall of the bag tube in order to hold this portion of the side wall flat against the surface of the drum. Drum 48 rotates in counterclockwise direction (FIG. 2) and it carries the end portion of the bag tube into position under a bag end closure forming roll 52. Roll 52 rotates in clockwise direction (FIG. 2) and it carries a pair of gripping fingers 54 and 56 which move the gussets on opposite sides of the bag tube as shown in FIG. 3 to press the top fold of the gusset on opposite sides against the surface of the roll between the score lines 44 and 46. An additional pair of gripping fingers 58 each of which are located on opposite sides of drum 48 are also moved into the gusset on opposite sides of the bag tube under fingers 54 and 56 to press the bottom fold of the gusset on opposite sides of the bag tube against the surface of drum 48.

In the preferred form of structure shown a pair of wedge shaped cam plates 60 are supported independently of drum 48 in position to enter the gussets on opposite sides of the bag tube to cam the top fold of the gusset upwardly away from drum 48 to open the mouth of the bag tube in order to assist the fingers to grip the bag tube in predictable manner (FIG. 3). After the grippers are in place continued rotation of roll 52 causes grippers 54 and 56 to fold the gusset and side wall of the bag tube back over toward the exposed surface of the tube which results in forming the open box shown in FIG. 2. While not necessary it is preferred to hold the trailing end of the bag tube between scoring rolls 41 while the box is being formed. This tends to assist in manipulation of the paper.

A stationary plow member 62 is supported in position adjacent roll 52 and after the box is opened up by grippers 54 and 56 the bag tube is advanced by contined rotation of drum 48 so that plow member 62 enters into the interior of the box just after grippers 54 and 56 release the paper. Grippers 54 and 56 release the top fold of the gusset before the entire bottom surface of the open box is positioned against the surface of the top wall of the bag tube and as illustrated in FIG. 2 best results are achieved if the grippers are released when the line of the gusset wall along the bottom of the box still forms an obtuse angle with the outer edge of the gusset fold in the bottom wall of the bag tube. As the bag continues to move the plow member flattens the bottom of the box and end flap 39 against the surface of the top wall of the bag tube. At the same time a pair of guide rails or rods 64 and 66 contact the upright opposite side walls of the box 68 and 70 to fold the walls in against the plow member and form the upright substantially vertical longitudinal fin 72. (FIGS. 2, 4 and 20).

Figure 4:
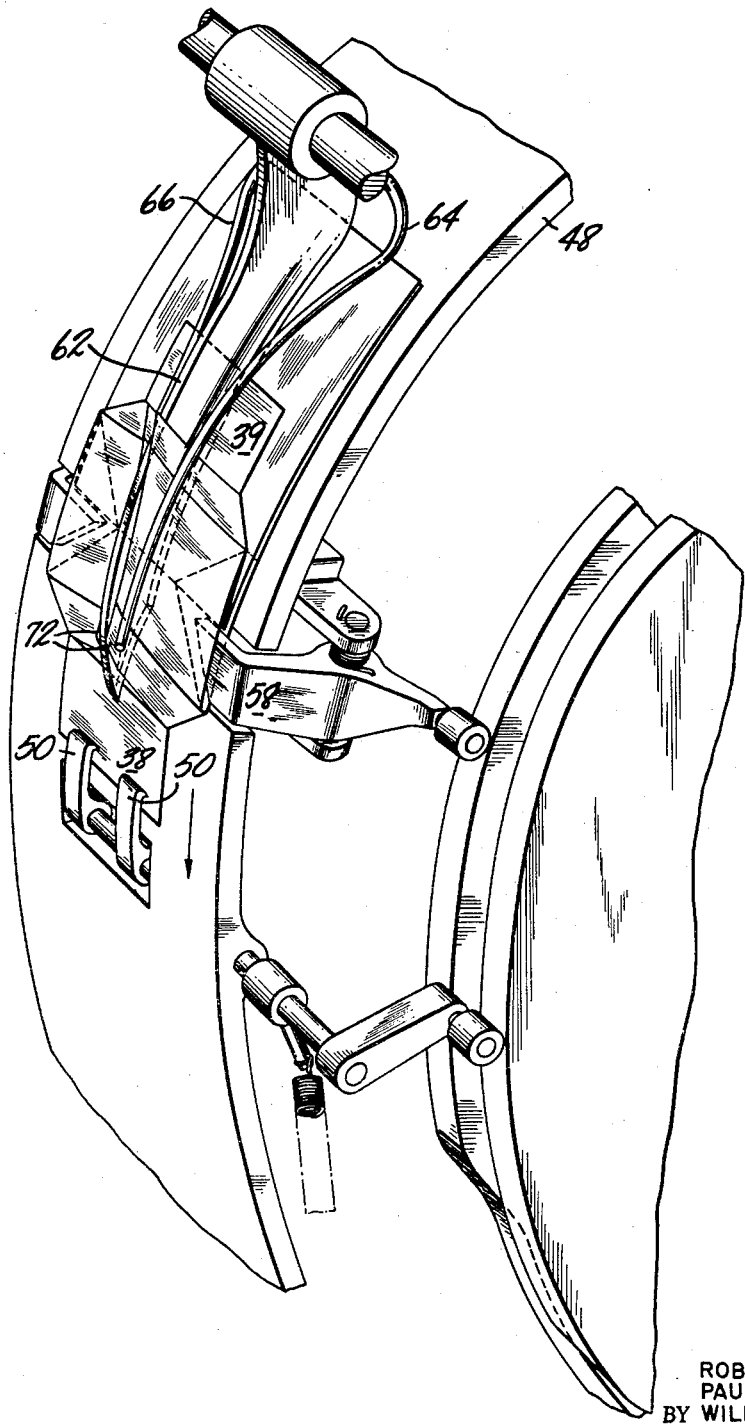
FIG. 4 is a perspective side view of the apparatus employed for flattening the open box down against the bag tube.

As best shown in FIG. 4, the end flaps 38 and 39 extend inwardly from the edges of the respective flaps to the score lines 44 in the top and bottom walls of the bag tube.

The slitting and scoring rolls and grippers and the means for actuating these members and feeding the bag tube to open one end of the tube into an open ended box are conventional and well known in the art. But the feature of holding flap 38 in depressed position against drum 48 and the feature of releasing grippers 54 and 56 before the bottom of the open box is folded down against the surface of the top wall of the gusseted bag tube to enable a stationary plow like member to enter into the interior of the partially formed box to flatten the bottom of the box against the surface of the top wall of the bag tube which results in forming the upright longitudinal fin is carried out in accordance with the present invention.

In the apparatus shown in the drawings drum 48 has four bag tube bottoming stations as indicated at 73 in FIG. 1. Each station is located ninety degrees apart so that four bag tubes may be processed for each single rotation of the drum. Since the slitting and scoring rolls and the grippers for opening the box of the end closure are conventional units customarily employed in bag making machines it is not deemed necessary to show or describe the details of the construction of these units or the cams employed for operating the units. As is customary in the art the position of these units on drum 48 may be adjusted to accommodate different size bag tubes and end closures.

As best illustrated in FIGS. 1 and 5 after the longitudinal fin 72 has been formed the bag tube is advanced and the fin is moved away from plow member 62 until the middle of the length of the fin is approximately in a horizontal plane through the diameter of the drum. Drum 48 rotates through an angle of about ninety degrees between the time when grippers 54 and 56 start to open the box and the time when the middle of the length of the fin arrives in horizontal position which is the pick up position for transferring the bag tube to a fin sealing drum 76. Both drums 48 and 76 and roll 52 all rotate continuously during operation.

Fin sealing drum 76 is mounted on a hollow shaft 78 for continuous rotation in clockwise direction (FIG. 5). The drum carries five pairs of heat sealing jaw members 80 each of which are spaced an equal distance apart around the circumference of the drum. Each pair of heat sealing jaw members are positioned at a station as indicated at 79 in FIG. 1 but for convenience of illustration only one pair of heat sealing jaw members are shown. The diameter of drum 76 is greater than that of drum 48 and the speed of rotation is controlled in conventional manner so that the peripheral speed of drum 76 is approximately equal to that of drum 48. The space between each of the stations on drum 76 and drum 48 is so arranged that a pair of heat sealing jaw members 80 arrive in the horizontal position to pick up a bag tube from each of the four stations on drum 48.

Figure 6:
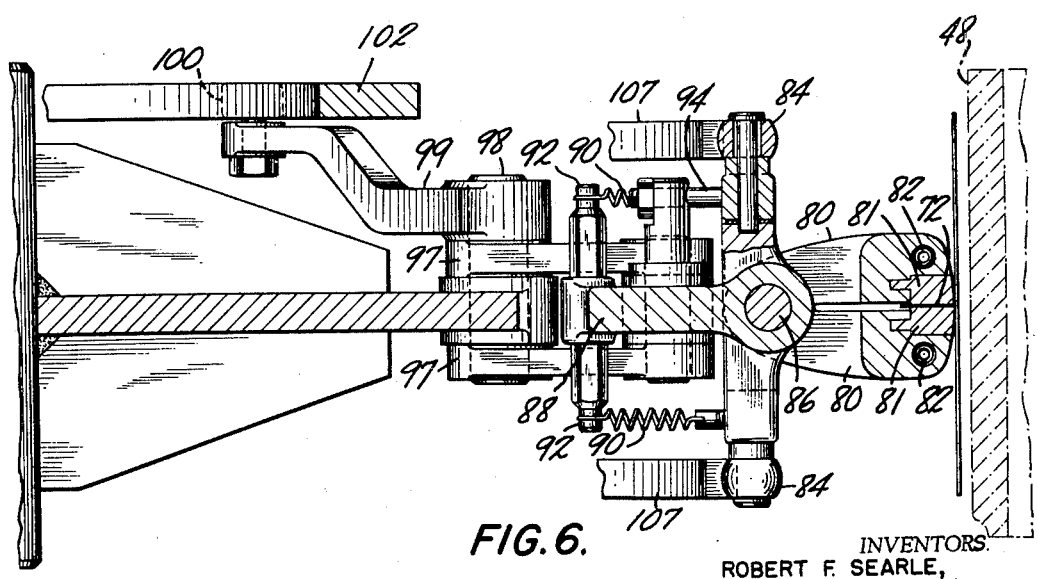
FIG. 6 is taken on line 6—6 of FIG. 5 to further illustrate the structure of the heat sealing jaw members shown in FIG. 5.

As best shown in FIGS. 5 and 6 each of the generally L-shaped heat sealing jaw members 80 is provided with a removable jaw face 81 and each jaw member has a conventional heat sealing element 82 in the form of a removable cartridge which generates the desired heat when supplied with electric current. The jaw members clamp the longitudinal fin of the bag tube and because of the heat and pressure the thermoplastic liner on opposite sides of the bag tube are fused together throughout the length of the fin. For example, a bag tube having a single outer ply of fifty pound super calendered bleached kraft paper with a cellophane liner coated with a heat fusible thermoplastic required a temperature of 270° F. and a jaw pressure of five pounds for heat sealing the thermoplastic material. The temperature and pressure may of course be adjusted depending upon the type of thermoplastic material employed in the liner.

The second end of each of the generally L-shaped jaw members carry a cam follower 84 for opening and closing the jaw members. Both jaw members are rotatively mounted on a shaft 86 of undercarriage 88 and each jaw member has a pair of springs 90 which are attached to the undercarriage by means of pins 92. The springs exert constant tension urging the jaw members to close and when closed the springs provide the pressure for fusing the thermoplastic liner in the longitudinal fin of the bag tube. A pair of fixed pins 94 are each mounted on opposite sides of undercarriage 88 in position to bear against the bottom of each of the L-shaped jaw members and the length of the pins is adjusted to hold the closed jaws in a predetermined position to insure uniform transfer of the bag tubes to drum 108. Otherwise, if the tensional force of the two springs 90 is not exactly equal the jaw members will tilt and get out of alignment and interfere with orderly transfer of the bag tube to drum 108. For convenience of illustration only one pin 94 is shown in the drawings.

The undercarriage 88 of the heat sealing jaw members is mounted on drum 76 by means of two links 96 positioned at one end of the jaw members and by means of two arms 97 positioned at the second end of the jaw members. The two links and arms are pivotally mounted on the undercarriage and on the drum and the arms are both keyed to a shaft 98 rotatively mounted in drum 76. One arm 97 carries on cam follower extension 99 which mounts a cam follower 100 which is held in contact with the cam rail 102 by means of spring 104. Spring 104 constantly urges the leading end of the undercarriage (in the direction of rotation of drum 76) to tip down toward the drum and the trailing end of the undercarriage to move away from the drum. As a result spring 104 constantly urges arm 97 to rotate in counterclockwise direction FIG. 5 to hold cam follower 100 against the cam rail 102.

As best shown in FIG. 5 the heat sealing jaw members are of rectangular shape and when the rectangle of the jaw members is made long enough to grip the longitudinal fin throughout its length a portion of the jaw at each end of the rectangle extends out beyond the pitch diameter of the drum represented by the dotted line 105. Because of this it is necessary to tilt the heat sealing jaw members to avoid contact with drum 48 as the jaw members move into the required position to grip the fin of the bag tube positioned on drum 48.

As the rectangular heat sealing jaw members approach the pick up point (FIG. 6) cam follower 100 and the extension 99 of arm 97 move in towards the center of the drum because of the depression 101 in cam rail 102. This causes upper portion of arm 97 to move outwardly away from the center of drum 76 and as a result the rear of the jaw is moved outwardly away from the drum and the leading end of the rectangular jaw is moved in toward the center of the drum and inside the line of the pitch diameter 105. The jaw members then move into the pick up position and as the center of the jaw is advanced beyond the horizontal plane of the pick up point the cam follower 100 and the extension 99 of arm 97 are moved outwardly away from the center of drum 76 which causes the rectangular jaw to tilt in the opposite direction to bring the trailing end portion of the jaw inside the line of the pitch diameter. This tilting of the heat sealing jaw members is an important feature of the present invention which makes possible the use of rectangular heat sealing jaws which effectively grip the entire length of the longitudinal fin of the bag tube. For the most efficient transfer of bag tubes from drum 48 to 76 these two drums are so mounted that a single horizontal plane may be passed through the center of both drums.

As the heat sealing jaw members 80 move into the pick up position cam 84 on each jaw member rides up the incline 106 of a cam rail 107 which lifts the cams (FIGS. 5 and 6) to open the heat sealing jaws. When the middle of the rectangular jaw is approximately in line with the center of the fin of the bag tube cams 84 ride down the inclines 108 of cam rails 107 under the tension of springs 90 close the jaw members and apply pressure for gripping the fin. As the jaw members close on the fin grippers 50 and 58 are released and the bag tube is released to the heat sealing jaw members which carry the bag tube around the drum for an angular distance of about two hundred and seventy degrees when the bag tube is again transferred to a drum 108 (FIG. 1). A guide rail 110 assists in controlling the position of the body of the bag tube relative to the periphery of drum 76.

One preferred way of supplying electric current to the jaw members carried by drum 76 is illustrated in FIG. 7. As there shown electric current from a conventional control box 112 is supplied to one of a pair of sliding contacts 114 which are mounted to rotate with the hollow shaft 78 of drum 76. The current is fed from the commutator through the hollow shaft by means of a conductor 116 to a terminal board 118. The terminal board carries a plurality of common terminals 120 and each of the heat generating cartridges 82 in jaw members 80 are connected to one of the common terminals by means of suitable conductors 122 which supply the current for generating heat. The circuit through the cartridge is completed by conductors 124, common terminals 126, conductor 128 and the commutator brush 130.

It will be understood that there are ten complete circuits (not shown) one for each of the ten heat sealing jaw members of drum 76. All of the circuits from the commutator brushes to the cartridges are protected by enclosure (not shown) in the hollow shaft and drum. The heat generating cartridges 82 may be readily installed in the jaw members and connected to the wires which are mounted in stationary position at each station on the drum. Since each heat generating cartridge is connected in parallel across conductors 116 and 128 the supply of power is the same for each insert and since the inserts are made to close tolerances the heat generated by each insert is approximately the same. As a result a single conventional temperature control element 130 connected to one of the heat generating cartridges may be employed for controlling the heat of all ten jaw members for sealing the thermal plastic liner in the longitudinal fin. The temperature control element is connected to the control box 112 by means of conductors 132 and 134 and commutator brushes 136 and 138 and conductors 139 and 140.

After the thermoplastic liner in the longitudinal fin of the bag tube is sealed the bag tube is transferred to drum 108 where it is prepared for the next heat sealing operation. As indicated at 141 drum 108 is provided with four stations (FIG. 1) each of which is adapted to take a bag from each of the five stations on the fin sealing drum 76. The four stations are spaced an equal distance apart around the circumference of drum 108 and the speed of rotation of drum 108 is controlled in conventional manner so that the peripheral speed of the drum is approximately equal to that of drum 76.

Figure 8:
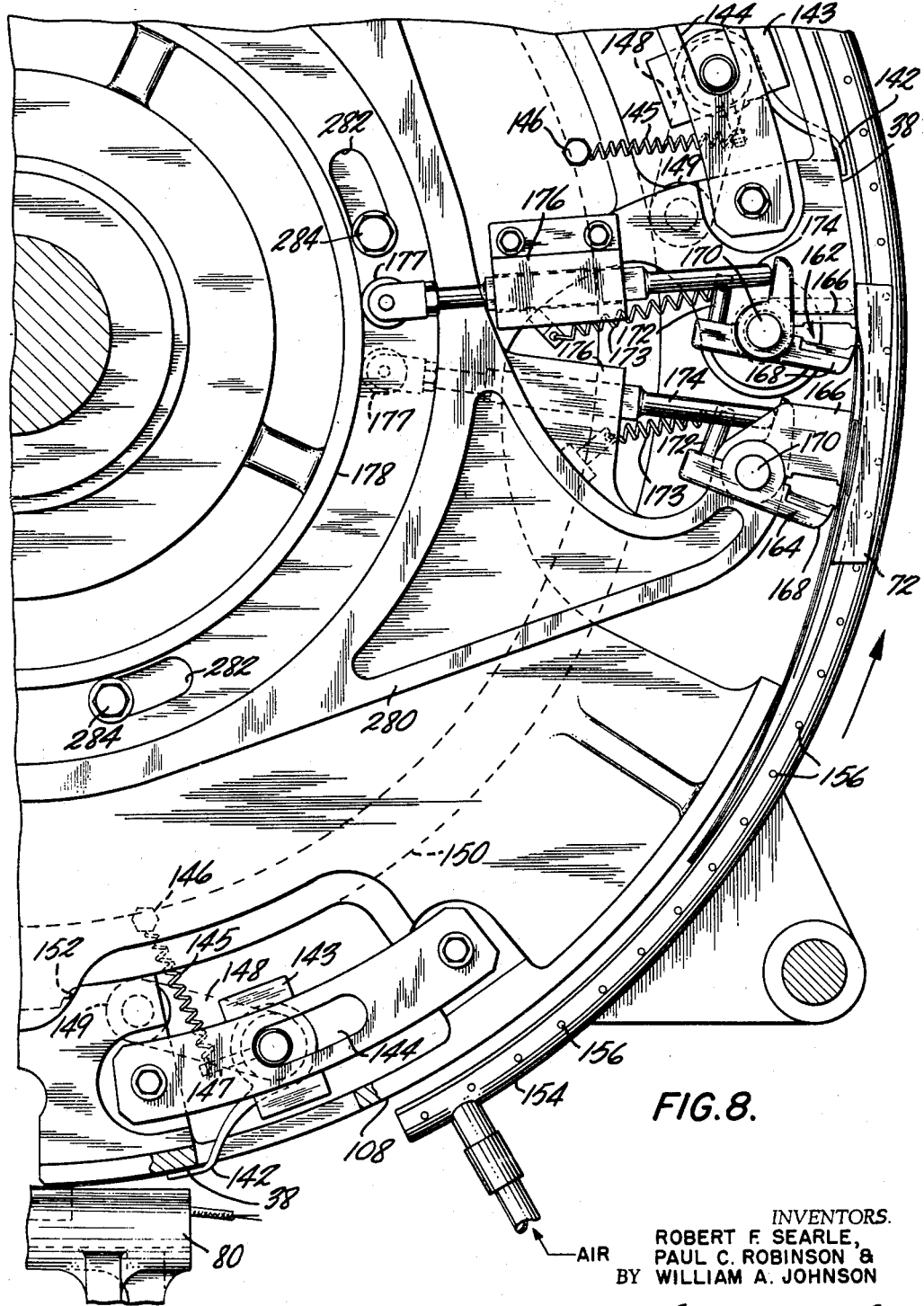
FIG. 8 illustrates a transfer drum shown in the apparatus of FIG. 1.
Figure 9:
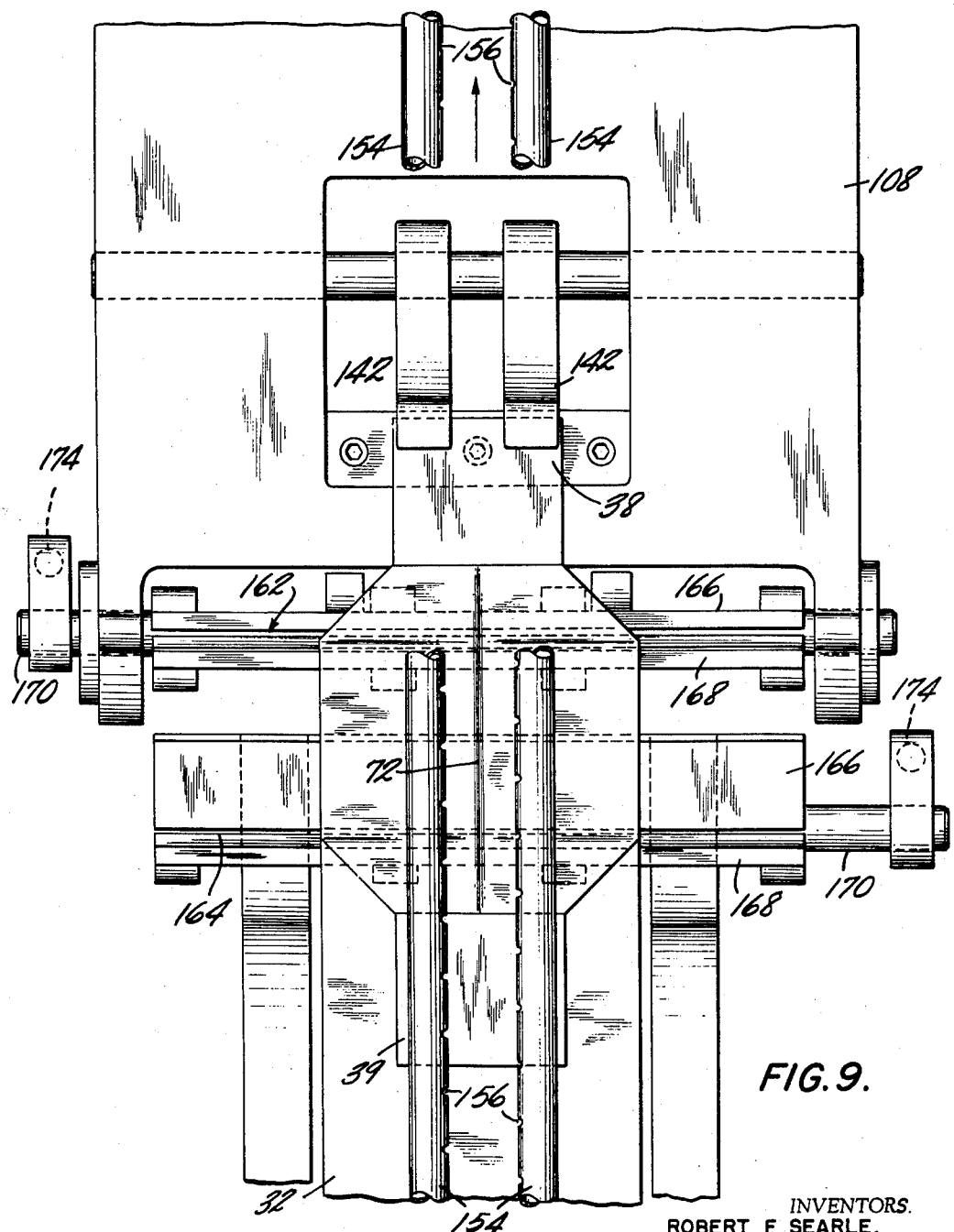
FIG. 9 is a side view of the transfer drum of FIG. 8.

As best shown in FIG. 8 a pair of gripping fingers 142 are mounted for rotation in each station in a bearing block 143 which is secured by conventional means as by a set screw (not shown) in any desired position in a slot 144 in drum 108. A spring 145 mounted at one end on a bolt 146 in the drum is connected at the second end to an arm 147 of the gripping fingers 142. Spring 145 exerts constant tension urging the gripping fingers 142 to close against the surface of drum 108. Opening and closing of fingers 142 is controlled by arm 148 and cam follower 149 which is pressed against cam rail 150 by the spring 145. As fingers 142 advance into the pick up point at the bottom of drum 108 the fingers are open ready to receive end flap 38 of the bag tube which is fed in under the open gripper. Cam arm 148 then rides down the depression 152 in cam rail 150 and spring 145 causes the gripping fingers to close on flap 38 whereupon the heat sealing jaw members 80 open and the bag tube proceeds to travel with drum 108 where it is held in position by fingers 142.

Referring to FIGS. 1 and 5 it will be understood that cam rail 106 is provided with an incline (not shown) adapted to open jaw members 80 for release of the bag tube to drum 108 and cam rail 102 is also provided with suitable camming surfaces (not shown) to tilt jaws 80 to avoid contact with drum 108 in the manner previously described hereinabove in connection with drum 48. The most efficient transfer of the bag tube occurs when drum 108 is so mounted that a single vertical plane may be passed through the center of both drums 76 and 108 and when fingers 142 are caused to close when the gripping surface is centered on such vertical plane.

As the bag tube is carried along on drum 108 longitudinal fin 72 projects out from the exposed surface of the tube (FIG. 8) in position between a pair of hollow guide tubes 154. Guide tubes 154 assist in holding the body of the bag tube adjacent the surface of drum 108 and each tube has a plurality of small holes 156 which direct a stream of air at the longitudinal fin to cool the fused plastic liner. Air is supplied to the tubes 154 by any convenient means (not shown).

As the bag tube approaches the top of drum 108 the fin passes under a fin flattening wire 158 (FIG. 10), which is arranged at an angle to contact the fin and flatten it down as the fin passes under the wire which is sloped downwardly toward the surface of the drum. A pair of guide members 160 located on opposite sides of the fin flattening wire assist in holding the bag tube flat against the surface of drum 108.

Drum 108 is provided with a pair of jaws 162 located under the leading end portion of the bag tube in position to grip the tube at score line 44 which marks one side of the end closure of the bag and a similar pair of jaws 164 are located to the rear in position to grip the body of the tube and end closure of the bag along the score line 44 which marks the second side of the bag end closure (see FIG. 20).

As best shown in FIGS. 8 and 10 the two pairs of jaws 162 and 164 are of identical construction and each is provided with one stationary jaw member 166 and a cooperating movable jaw member 168 pivotally mounted on a stub shaft 170. The movable jaw member carries an arm 172 which mounts a spring 173 held under constant tension to urge the movable jaw to close against the stationary jaw. Rod 174 mounted to reciprocate in a suitable bearing 176 controls the opening and closing of the movable jaw member and for this purpose rod 174 has a cam follower 177 which rides on the cam rail 178. In the preferred form of structure shown the bearing 176 and the shank of rod 174 carried by the bearing are square in order to prevent rotation of rod 174 and keep the cam follower properly oriented on cam rail 178.

The bag tube is tucked down in between the jaws 162 and 164 by means of a pair of tucking blades 180 and 182 respectively (FIGS. 10, 11, and 12). Each tucking blade is of identical construction and each blade is mounted on a generally rectangular block 184 which has a pair of stub shafts 186 at each end that are pivotally mounted in a pair of arms 188. Each end of the rectangular block fits into an opening 189 in arm 188 and there is a small space between the rectangular block and side walls of the opening 189 to permit the block to pivot a limited amount relative to the arms. Arms 188 are mounted in fixed position on shaft 190 which rotates in counterclockwise direction (FIG. 10) and the rotation is so timed that a tucking blade enters the space between each pair of jaws 162 and 164 on transfer drum 108.

A stripper plate 192 is mounted at the bottom of block 184 adjacent the tucking blades by means of bolts 193 which are slidably mounted in the block 184. Compression springs 194 press against the plate to urge it to move away from the block. The head of bolts 193 are thereby caused to bear against the rectangular block and limit movement of plate 192 away from the block.

Jaws 162 and 164 are open as they approach the top of drum 108 and the tucking blades are so adjusted that the blades enter down into the space between the jaws to tuck a portion of the bag tube along the score lines 44 down in between the jaws. As the tucking blades move down into the jaws the stripping plate 192 contacts the bag tube on the surface of drum 108 and continued rotation causes the plate to move upwardly toward the bottom surface of block 184. The tuck is completed when the clamping surface of the stationary jaw 166 is approximately in a vertical plane through the diameter of drum 108. At this time the movable jaw member 168 is closed against the stationary jaw 166 by spring 173 as the cam follower 177 rides down the depression 195 on cam rail 178. The jaw grips the tuck of the bag tube under the pressure of spring 173 and continued rotation of drum 108 and shaft 190 results in separating the tucking blade 180 from jaw 162. Since the tucking blade and the line of contact between the two jaw members move out of the line of a vertical plane through the diameter of drum 108, the grip of the jaws on the tucking blade will cause the blade and its housing to pivot on the stub shafts 186 and this makes it possible to move the tucking blade out from between the two jaw members without disturbing the position of the tuck of the bag tube between the jaws. The spring loaded stripping plate 192 assists in keeping the tuck of the bag tube between the jaws as the tucking blade is separated from the jaws and spring 194 causes the plate to move down away from block 184 to strip the tuck of bag tube from the tucking blade and hold it pressed down in between the two jaw members. At the time the first tuck is made in the bag tube the longitudinal fin is held flat against the end closure of the tube by the fin flattened wire 158 and since the flattened fin is tucked between jaws 162 it is held flat by these jaws while the second tuck is formed in the tube. The second tuck is formed in the bag tube by jaw 164 and tucking blade 182 in the same manner described for the first tuck. As shown in FIG. 13 the two tucks in the bag tube which are positioned at opposite sides of the end closure cause the two end flaps 38 and 39 to stand upright on the surface of drum 108. Rotation of the drums 76 and 108 and tucking blades 180 and 182 is synchronized in conventional manner by conventional means not shown to provide each of these with the same peripheral speed to effect the transfer of bag tubes from drum 76 to 108 and the tucking operation performed by the blades.

Drum 108 continues to rotate until end flap 38 is approximately in a horizontal plane through the diameter of drum 108 and then heat sealing jaws 196 and 198 mounted on drum 200 (FIG. 13) clamp the respective flaps to seal and fuse the thermoplastic liner across the end flaps of the bag.

Referring to FIG. 1 drum 200 has five stations as indicated at 201 each of which is adapted to receive a bag tube from drum 108. Drum 200 continuously rotates in clockwise direction (FIG. 13). For the most efficient transfer of bag tubes drum 200 is so mounted that a single horizontal plane may be passed through the center of both drums 108 and 200.

Figure 14:
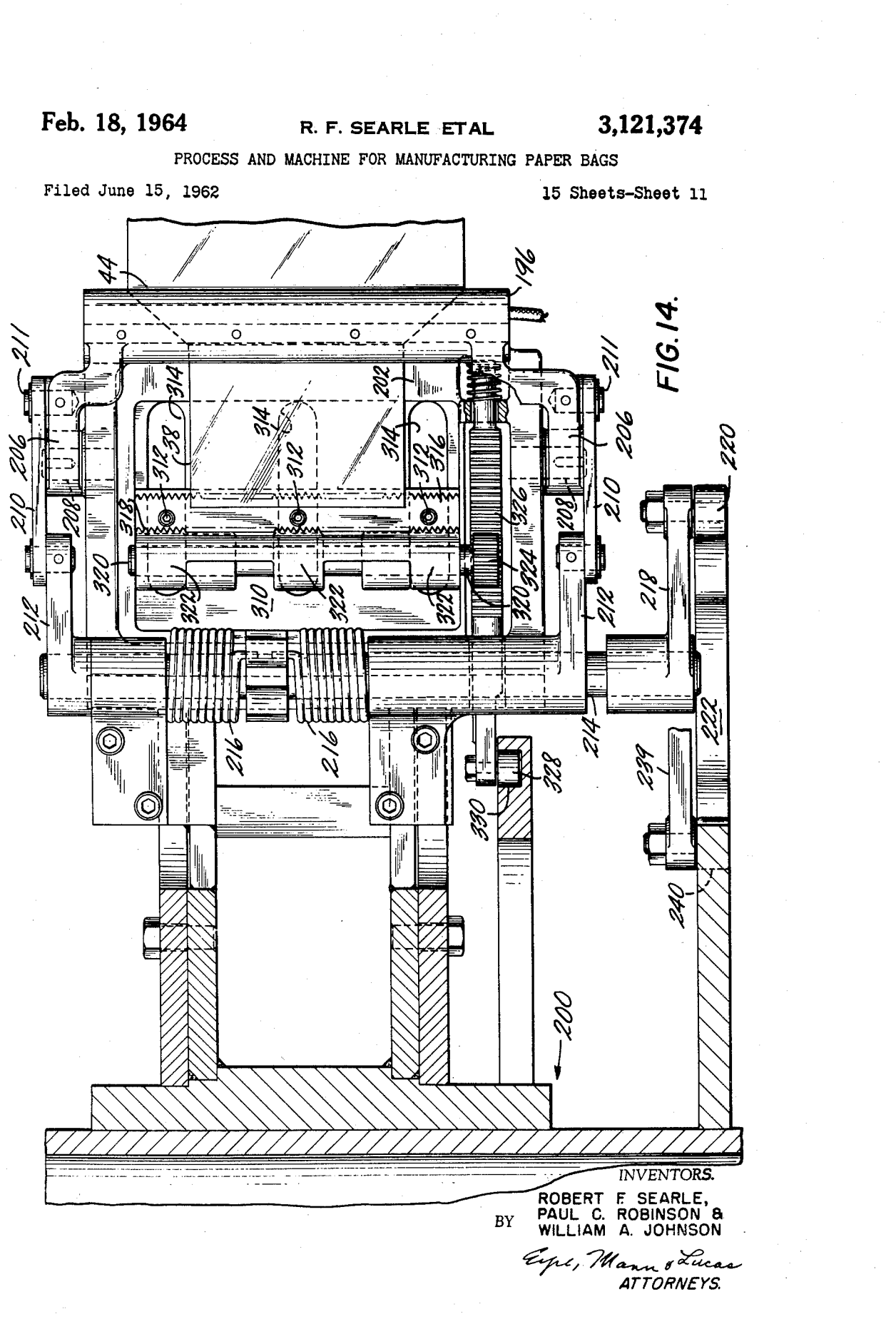

The detailed construction of the heat sealing jaws for the end flaps is shown in FIGS. 13 and 14. Since the heat seal across the end flap is positioned a substantial distance inwardly away from the edge of the flap, the heat sealing jaws must be wide open in order to clamp the end flap adjacent the line of the tucks in jaws 162 and 164. In the form of construction shown the angle between the two jaw members when fully opened is about ninety degrees (see FIGS. 13 and 15).

Figure 15:
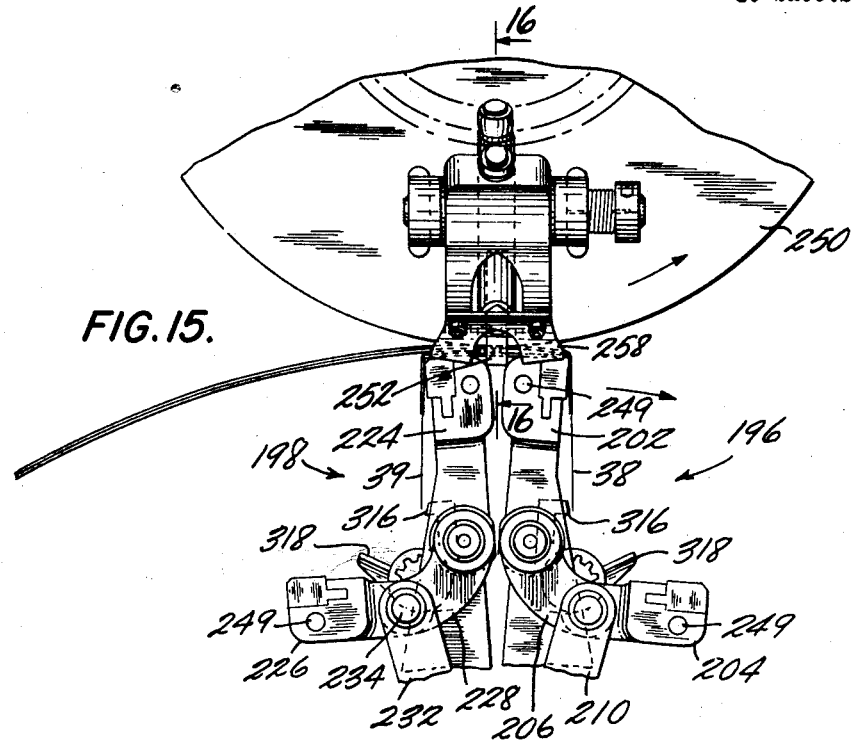
FIG. 15 illustrates the bag tube transfer point in which the bag tubes with heat sealed end closure are transferred to a final drum for pasting down the end flaps to complete the end closure in the bag.

Heat sealing jaw 196 which clamps end flap 38 of the bag tube comprises a stationary jaw member 202 and a movable jaw member 204 which is in position to lead the stationary jaw in the direction of rotation of the drum. The movable jaw member 204 is pivotally mounted on by means of a pair of links 206 which are in turn pivotally mounted on stub shafts 208 on the stationary jaw. A second pair of links 210 are rotatively mounted at one end on the movable jaw as at 211 and the second end of links 210 are pivotally connected to one end of arms 212 which at their second end are keyed to a shaft 214. The connection of link 210 with arm 212 forms a toggle joint so that these two members are substantially in a straight line when the movable jaw member is closed against the stationary jaw member as shown in FIG. 13. When the jaws are open the toggle point is buckled in the direction of the arrow in FIG. 13 to open the jaws and form an angle of approximately ninety degrees between them as shown in FIG. 15. The toggle action of the link and arm provides very rapid and positive opening and closing of the jaw members and because of the toggle action of the links only a small spring force is necessary to provide a high gripping pressure. A pair of springs 216 on shaft 214 (FIG. 14) constantly urge shaft 214 to rotate in clockwise direction (FIG. 13) to close the jaw members. The opening and closing of the jaws is controlled by means of arm 218. One end of arm 218 is keyed to shaft 214 and the second end of the arm carries a cam follower 220, which rides against the stationary cam track 222.

Heat sealing jaw 198 is of similar construction to that of heat sealing jaw 196. In the case of jaw 198 the leading jaw member 224 in the direction of rotation (FIG. 13) is the stationary jaw and the movable jaw member 226 is the trailing jaw member. The movable jaw member 226 is pivotally mounted by links 228 which are pivotally mounted at their second end on stub shafts 230 of the stationary jaw member. A second pair of links 232 are rotatively mounted at one end on the movable jaw member as at 234 and the second end of links 232 are pivotally mounted at one end of a pair of arms 236 which are in turn keyed to a shaft 238. An arm 239 keyed to shaft 238 has a cam follower 240 which rides against the stationary cam track 242. A pair of springs (not shown) are mounted on shaft 238 in identical manner to the springs of jaw 204 and the springs constantly urge shaft 238 to rotate in counterclockwise direction (FIG. 13) to close the jaws and exert gripping pressure against the stationary jaw member. Pivotal arm 236 and link 232 provide the same toggle action as links 210 and 212 of the heat sealing jaw 196.

Rotation of drums 108 and 200 is synchronized in conventional manner by conventional means (not shown) to provide the same peripheral speed on both drums so that as end flap 38 is moved into position approximately in a horizontal plane through the diameter of drum 108 the line of contact between the two jaw members of heat sealing jaw 196 when closed will also lie approximately in the same horizontal plane with end flap 38. When the heat sealing jaw 196 approaches the horizontal pick up position the two jaw members are open and at the pick up position cam follower 220 on track 222 moves outwardly toward drum 108 (FIG. 13) so that springs 216 will rotate shaft 214 and arm 212 in clockwise direction (FIG. 13) to close the movable jaw member 204 over against the stationary jaw 202 and grip flap 38 with the clamping pressure provided by the springs. At this time jaw 162 is opened as cam follower 177 rides down on an incline (not shown) on cam rail 178.

Drums 108 and 200 continuously rotate and when the second end flap 39 of the bag tube is in the pick up position the movable jaw member 226 is closed against the stationary jaw member 224 when the cam follower 240 on the pivotal arm 236 rides down the incline 248 on cam track 242 to rotate the pivotal arm in counterclockwise direction, FIG. 13, and cause the heat sealing jaw 198 to grip end flap 39. Jaw 164 on transfer drum 108 is opened in a manner described for jaw 162 after the heat sealing jaw 198 is closed on the end flap 39.

Cam tracks 222 and 242 and the inclines in the cam tracks for closing the jaws are for convenience of illustration set off to one side of the jaw members in an arbitrary position. In the operative machine the inclines in the cam tracks will be so located as to close the jaw members as described hereinabove.

The heat sealing jaws 196 and 198 are each provided with conventional heat sealing elements 249 which are supplied with electricity for generating heat preferably in the manner previously described for the heat sealing jaws 80 on drum 76. As drum 200 continues to rotate the pressure and heat of the jaws fuse the thermoplastic liner in the end flaps to complete the seal in the end closure of the bag tube and make it sift proof. The pressure and temperature employed is the same as that specified for the heat sealing jaws 80 which seal the thermoplastic liner in the longitudinal fin.

The heat sealing jaws 196 and 198 carry the bag tube through an angle of approximately two hundred and seventy degrees until a line through the center of the space between the two jaws is approximately in a vertical plane through the diameter of drum 200 whereupon the bag tube is transferred to a final drum 250 which is adapted to fold and paste the end flaps down to finish the bag structure. The pasting and folding down of the end flaps to complete the finished bag may be carried out in conventional manner with conventional equipment. In accordance with the present invention, a preferred form of apparatus used for completing the end closure of the bag is shown which employs the rotating drum 250 illustrated in the drawings.

Figure 16:
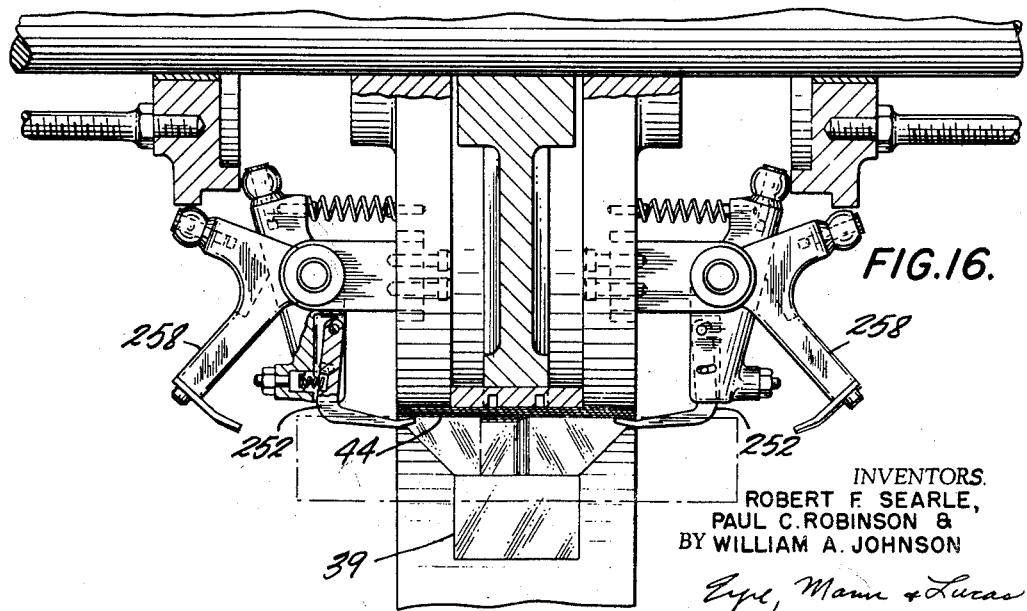
FIG. 16 is taken on line 16—16 of FIG. 15.

Rotation of drums 250 and 200 are synchronized in conventional manner by conventional means (not shown) to provide the drums with the same peripheral speed to effect transfer of the bag tubes and as before most effective transfer is achieved by so mounting drum 250 that a single vertical plane may be passed through the center of both of the drums 200 and 250. As illustrated in FIG. 1 drum 250 is provided with two stations as indicated at 251 each located ninety degrees apart on the drum. The drum 250 continuously rotates in counterclockwise direction (FIG. 1) and rotation of drum 250 is synchronized with the clockwise rotation of drum 200 so that a station of drum 250 is in position to pick up a bag tube from each of the stations on drum 200. As illustrated in FIG. 16 each of the stations on drum 250 is provided with a pair of conventional grippers 252 each located on opposite sides of the drum. As illustrated in FIG. 15 the grippers are made to fit into the space between the heat sealing jaws 196 and 198 of drum 200. When the bag tube has been advanced into the pick up position by drum 200 conventional cams customarily used in paper bag machines actuate grippers 252 to swing in between jaws 196 and 198 below the bag tube whereupon the grippers press the body of the end closure against the surface of drum 250. At the same time follower 220 engages the stationary cam track 222 (not shown) which causes arm 218 to rotate in counterclockwise direction (FIG. 13), to open the heat sealing jaw 196 and cam follower 240 engages the stationary cam track 242 which causes arm 236 to rotate in clockwise direction and open jaw 198. The bag tube is then carried by grippers 252 on drum 250. In this connection it will be understood that the stationary cam tracks 222 and 242 hold jaws 196 and 198 open until the jaws are again closed to receive a bag from drum 108.

In order to more firmly grip the bag tube on drum 250 a second pair of conventional grippers 258 having two fingers positioned on opposite sides of the drum (FIG. 15) are actuated by conventional cam means to rotate in over the end closure and press it inside the score lines 44 against the surface of drum 250. As a result opposite sides of the end closure of the bag tube are each firmly held in fixed position on drum 250 by three gripping fingers and the end flaps 38 and 39 project up above the surface of the bag tube because of the sharp crease line formed by the tucking jaws 162 and 164. It will also be noted that the sharp crease line formed by the tucking jaws along the score lines 44 cause the longitudinal fin to lie substantially flat down against the surface of the end closure of the bag tube.

The next step is to apply conventional adhesive to the end closure for pasting down and sealing the flaps. This is done by a conventional roll 260 (FIGS. 1 and 18) which contacts the end closure to apply adhesive in the generally horseshoe shaped pattern shown in FIG. 18. Since the end flaps project upwardly away from the periphery of drum 250 a shoe 262 pivotally mounted at 264 is actuated in conventional manner by suitable cams (not shown) to swing in against the leading end flap 38 and flatten it against the periphery of drum 250 so that it will be fed in orderly manner in between rolls 250 and 260. Otherwise the end flap 38 might be folded over and the paste would not be applied in the desired pattern. Suitable guide wires 265 are provided to hold the end flaps down as the bag is fed in under the adhesive applying roll 260.

After the adhesive is applied the rear or trailing end flap 39 is folded down and pressed against the body of the end closure where it is securely held by adhesive.

This is done in conventional manner by a rod 264 mounted at opposite ends in a pair of chains 266. The chains and rod are rotated in clockwise direction by gears 268, 269 and 270 (FIG. 19) at a speed greater than that of the bag tube and as a result the rod overtakes the end closure to contact the rear flap 39 and fold it down into the end closure of the bag tube where it is held by the adhesive.

Figure 19:
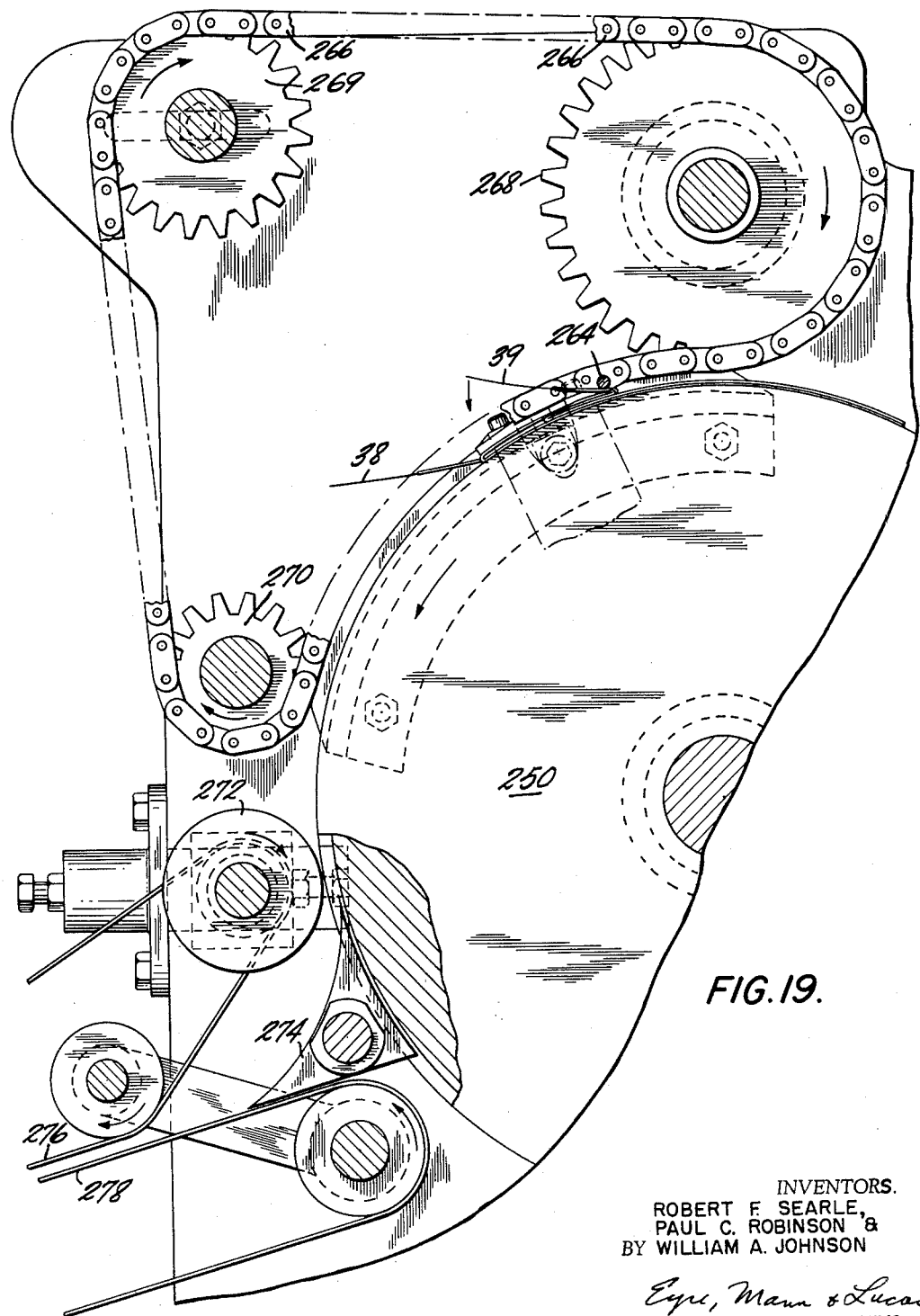
FIG. 19 illustrates additional apparatus employed for pasting down the end flaps in the closure of the bag.

A roll 272 positioned adjacent the periphery of drum 250 rotates in clockwise direction FIG. 19 and the leading end flap 38 which projects out away from the periphery of drum 250 is contacted by the roll and folded back down against the end closure of the bag tube where it is firmly held by the adhesive. This completes the formation of the end closure. As the finished bag passes out from between rolls 272 and 250 grippers 252 and 258 are released and the leading end portion of the finished bag is guided by a shoe 274 into a pair of conventional pinching conveyor belts 276 and 278.

Another advantage of the apparatus of the present invention is that it may be readily adjusted to accommodate a change in size of the bag tube. Referring to FIG. 20 it will be seen that the distance B which represents the width of the end closure in the finished bag must always equal the distance G or width of the gusset in order to have a so called self opening square (SOS) bag. If the width G of the gusset is changed the distance B will also change and in order accurately to tuck the end closure of the bag tube along score line 44 on drum 108 it is necessary to change the distance between jaws 162 and 164 on the transfer drum 108.

To this end jaws 164 are mounted on a spider 280 which is in turn secured to drum 108 by means of a plurality of slots 282 and cooperating bolts 284. In order to change the distance between jaws 162 and 164 it is only necessary to loosen the bolts 284 and move the spider to increase or decrease the distance between the jaws 162 and 164. Thereafter, the bolts 284 are tightened to hold jaws 164 in the desired position relative to jaws 162. There is no need to change the position of cam rail 178 since the closing of the jaws to tuck the bag tube and subsequent opening of the jaws always occur at a fixed point along the periphery of the drum 108. It is necessary, however, to change the position of the tucking blade 182 on shaft 190 to correspond to the change in position of jaws 164. As best shown in FIG. 10 arms 188 which mount the tucking blades on shaft 190 have a split collar 286 held in place on shaft 190 by means of a set screw (not shown). By loosening the set screw the position of the tucking blade 182 may be readily changed to correspond to the change in position of jaws 164.

When the size of the gusset of the bag tube is changed, it is also necessary to adjust the position of the heat sealing jaw 198 on drum 200. As in the case of jaw 164 each of the jaws 198 are mounted on a movable spider 300 which is in turn mounted on drum 200 by means of a plurality of slots 302 and bolts 304. The position of the jaws 198 relative to jaws 196 is readily changed by loosening the bolts and moving the spider the desired distance. As in the case of jaws 164 there is no need to change the position of the cams for controlling jaws 198 since the jaws are always opened and closed at a fixed point relative to the periphery of the drum. It will be kept in mind that the position of score line 44 in the leading end portion of the bag tube is always fed into the same position on the drums 108 and 200 so that it is only necessary to compensate for change in the position of score line 44 in the trailing end portion of the end closure.

In the above description it is assumed that the overall length T of the bag end closure remains constant. This is not necessarily true and if the overall length T of the end closure is also changed with change in the width of the gusset or if the width of gusset is held constant and the overall length T is changed by change in the length P of the end flaps (38, 39) it is then necessary to make the following change to compensate for change in position of the leading edge of end flap 38. As previously described score line 44 in the leading end portion of the bag tube will still be fed into the same relative position on drum 108 and it is therefore only necessary to adjust the position of the gripper for the leading edge of the end closure. This is readily done by merely changing the position of the bearing block 143 relative to the slot 144.

The position of each of the grippers 142 must be individually changed in the slot so that the gripper will be in proper position to grip the leading edge of flap 38. No change in the cam for the gripper is necessary since gripping always takes place at a fixed point relative to the periphery of the drum.

The gripping fingers on drum 48 are, of course, changed in conventional manner for change in size of the end closure of the bag tube. However, no change is necessary in the heat sealing jaws 80 since they are made long enough to accommodate the entire length of longitudinal fin for the largest size bag that the apparatus can handle without major change in construction. The apparatus when adjusted as described above is capable of forming an end closure in a bag tube in which W (FIG. 20) is about four and one-half to about eight inches; G about three to about five inches and the overall bag tube length about eleven to about twenty-one and one-half inches.

Referring again to FIG. 20, the length of the end flaps 38 and 39 (P) is equal to one half W plus F. When P is equal to or less than B the end flaps may be folded into the end closure of the bag without difficulty. It is frequently desirable to make P longer than B. In such case the outer end edge portion of both of the end flaps 38 and 39 must be trimmed off in order to fold the flaps down flat within the confines of the end closure of the finished bag. If necessary the end flaps may be trimmed off while the bag tube is being processed on drum 200.

For this purpose each of the heat sealing jaws 196 and 198 on drum 200 carry a cutter adapted to trim off a portion of both of the end flaps of the bag tube if that should be necessary. Since each of the cutters are of identical construction only one of them is shown and described. The cutter for heat sealing jaw 196 is best shown in FIG. 14. As there shown a support member 310 is adjustably mounted on the body of the stationary jaw 202 by means of bolts 312 which fit into slots 314 in the body of the stationary jaw. A fixed cutter blade 316 is carried at one end of the support and a movable cutter blade 318 is mounted at the other end of the support on a shaft 320 adapted to rotate in bearings 322. Shaft 320 has a pinion gear 324 mounted at one end which is in mesh with the teeth in a rack 326 slidably mounted in the support. Rack 326 is provided with a cam follower 328 which rides in a stationary cam track 330. As previously described the heat sealing jaw 196 grips the end flap 38 adjacent the score line 44 in the end closure and as a result the end portion of the end flap 38 projects inwardly beyond the bite of the two cooperating jaw members and the end portion of the flap is positioned along the body of the stationary jaw member. When the cutter is to be used, bolts 312 are loosened and support 310 is moved outwardly toward the heat sealing jaw members until the stationary cutter blade 316 is in position to cut off a portion of the end flap 38. The bolts 312 are then tightened. As the heat sealing jaw moves into position to pick up end flap 38, cam follower 328 rides outwardly toward the periphery of the drum as the follower moves along the cam track 330 and as a result rack 326 is moved to the right (FIG. 13) to cause the movable cutter blade 318 to rotate in clockwise direction away from the stationary blade 316. The end flap is then gripped by the heat sealing jaw 196 with the end edge portion of the end flap in position over the stationary cutter blade 316. As the drum continues to rotate cam follower is moved inwardly away from the heat sealing jaws as the follower rides along the incline 334 in cam track 330. This causes rack 326 to move inwardly away from the heat sealing jaws and rotate the movable cutter bar in counterclockwise direction (FIG. 13) past the stationary cutter bar 310 which cooperates with the movable cutter bar to cut away the end portion of flap 38. A single cam track is employed for each cutter and the cam follower rides between the rails which positively control the follower without using springs.

It will be understood that it is intended to cover all changes and modifications of the preferred form of structure herein chosen for the purpose of illustration which do not constitute departures from the spirit and scope of the invention.

What is claimed is:

1. The method of forming a closure in one end portion of a bag tube having top and bottom walls separated by a gusset wall at each side with heat fusible material at least positioned on inner surface portions of said end portion of the bag tube which comprises the steps of advancing a length of bag tube in the direction of its length, slitting at least one wall in said end portion to form a flap therein, gripping the flap, folding the second wall in said end portion back away from the direction of travel to form an angle between adjacent overlapped surfaces of such wall and an open box with upstanding side walls, and then while the flap is held in a depressed position, collapsing the box by folding the opposite upstanding side walls downwardly into the interior of the box to bring the interior of opposite end portions of said side walls into face to face contact to form an upstanding longitudinal fin and to position a portion of the inner surface of said side walls adjacent both sides of the fin in overlapping relationship with portions of the inner surface of the first and second mentioned walls respectively, applying heat and pressure to the longitudinal fin to bond the heat fusible material of opposite end portions of said side walls in the fin, and then completing the end closure of the bag tube by folding the first and second mentioned walls in said end portion inwardly over the fin and pasting them in place.

2. The method specified in claim 1 which includes the step of, applying heat and pressure across the top and bottom walls and overlapping portions of the side walls to bond the heat fusible material.

3. The method specified in claim 1 which includes the step of, scoring the top and bottom walls in a line across said one end portion of the bag tube to assist in folding the top wall back away from the direction of travel of the tube.

4. The method specified in claim 1 which includes the step of scoring the top and bottom walls in the line across said one end portion of the bag tube in position to delineate opposite ends of the box and assist in forming the end closure in the bag tube.

5. The method specified in claim 1 which includes the steps of continuously advancing a length of bag tube in the direction of its length, and then during such advance changing the direction of travel of the bag tube and thereafter applying heat and pressure to the longitudinal fin, and then again changing the direction of travel of the bag tube before folding the top and bottom walls inwardly over the fin.

6. The method specified in claim 1 which includes the steps of forming two spaced tucks in the collapsed box which extend across the width of the tube after heat and pressure have been applied to the longitudinal fin, and then gripping each of said tucks to raise opposite end portions of the collapsed box above the level of the surface of the bag tube, thereafter applying heat and pressure to the raised opposite end portions.

7. The method specified in claim 6 which includes the step of locating the two spaced tucks in position to include a portion of the longitudinal fin in each of said tucks.

8. The method of forming a closure in one end portion of a gusseted bag tube having heat fusible material at least in said end portion thereof which comprises the steps of holding a portion of one of the bag walls in said one end portion down while forming an open box with upstanding side walls in such end portion, collapsing the two opposite upstanding side walls of the box inwardly to bring opposite end portions of such walls into face to face contact to form an upright longitudinal fin and flaps positioned at opposite ends of said longitudinal fin, applying heat and pressure to the longitudinal fin to seal the heat fusible material in the fin, applying heat and pressure across opposite ends of the fin and across the end flaps to seal the heat fusible material in the end flaps and then folding the end flaps inwardly in overlapping relationship and pasting the end flaps down to complete the end closure in the bag tube.

9. The method of forming a closure in one end portion of a bag tube having top and bottom walls and gusseted walls at opposite sides thereof in which slits are positioned at least in the bottom wall in said one end portion to form a flap and in which thermoplastic material is positioned at least on portions of the inner surface of said end portion which comprises the steps of separating the top and bottom side walls in said end portion to form an open box with upstanding side walls while holding said flap in a depressed position, collapsing the opposite side walls into the box to bring end portions of such side walls into face to face contact and form an upright longitudinal fin and flaps at opposite ends of said fin applying heat and pressure to said fin to fuse the thermoplastic material, applying heat and pressure to opposite end portions of the fin and to the end flaps to seal the thermoplastic material and then folding the end flaps in over the fin and thereafter pasting the end flaps in place to complete the end closure in the bag tube.

10. The method of forming a closure in one end portion of a bag tube having top and bottom walls and gusseted walls at each side thereof and a heat sealable material on the inner surface of said one portion of the tube which comprises the steps of slitting the top and bottom walls in said one end portion to form a flap in each of said walls, separating the top and bottom side walls in said one end portion and then folding the opposite side walls in said end portion inwardly to bring the inner surface at the end portion of said side walls into face to face contact to form a longitudinal fin which projects up above the surface of the side walls and to position a portion of the interior surface of each of said side walls adjacent opposite ends of the fin in face to face contact with the interior surface of the said top and bottom walls respectively, applying heat and pressure to the longitudinal fin and to that portion of the side walls and top and bottom walls positioned in face to face contact to seal the heat sealable material, and then completing the end closure by pasting the top and bottom walls in said end portion in position over the fin.

11. The method of forming a closure in one end portion of a bag tube having top and bottom walls and gusseted walls at each side thereof and heat sealable material on portions of the inner surface of said end portion which comprises the steps of slitting at least the botom wall of said one end portion to form a flap therein, gripping the flap in said bottom wall to hold it down, folding the top wall in said end portion back toward the body of the bag tube substantially to straighten out the gusset in the opposite side walls and raise both side walls above the level of said flap, folding the side walls inwardly toward each other to bring the interior of opposite end portions of said side walls into face to face contact to form a longitudinal fin which projects up above the level of said flap and to position an interior surface portion of each of said side walls adjacent opposite ends of the fin in overlapping relationship with the interior surface of said top and bottom walls respectively, applying heat and pressure to said fin and thereafter to the top and bottom walls and the overlapping portion of said side walls to seal the heat sealable material, and then folding the top and bottom walls in said end portion inwardly over the fin and pasting them in place to complete the end closure.

12. Apparatus for continuously advancing a bag tube in the direction of its length and during such advance for forming a closure in one end portion of such bag tube which has top and bottom walls and gusseted side walls with heat sealable material positioned in said one end portion and in which at least the bottom wall of said one end portion is slitted to provide a flap which comprises:
- (a) grippers for separating the top and bottom walls in said one end portion to form an open box
- (b) a stationary plow blade member in position to enter the open box upon advance of the bag tube
- (c) a finger for gripping said flap to hold it in depressed position while the plow blade member moves into the interior of the open box
- (d) means for collapsing the side walls of the box inwardly to bring end portions of each of the side walls into position against the plow blade member to form a longitudinal fin positioned lengthwise in the bag tube
- (e) first heat sealing jaws for gripping the longitudinal fin
- (f) means for actuating such heat sealing jaws to grip the longitudinal fin and apply heat and pressure thereto for sealing the heat sealable material
- (g) tucking jaws
- (h) a pair of tucking blades adapted to cooperate with said tucking jaws to tuck a portion of the collapsed box in between the said tucking jaws
- (i) means for actuating said tucking jaws to grip the tuck of the bag tube and thereby cause the end portion of the top and bottom walls of the collapsed box to project up above the level of the bag tube
- (j) second heat sealing jaws
- (k) means for actuating said second heat sealing jaws to grip the top and bottom walls above the level of the tucking jaws and apply heat and pressure across the width of said walls to seal the heat sealable material
- (l) means for pasting and folding the top and bottom walls inwardly over the fin in overlapping position to complete the end closure for the bag tube.

13. Apparatus as specified in claim 12 in which:
- (a) said finger for gripping said flap is mounted on a rotating drum which rotates in one direction
- (b) said first heat sealing jaws are mounted on a rotating drum which rotates in a second direction
- (c) said tucking jaws are mounted on a rotating drum which rotates in said one direction
- (d) said pair of tucking blades being mounted to rotate in said second direction
- (e) said second heat sealing jaws being mounted on a rotating drum which rotates in said second direction.

14. Apparatus as specified in claim 12 in which the means for collapsing said open box against the plow blade member comprises a pair of stationary guide rails which are positioned on opposite sides of said plow blade member to collapse the side walls of the box in against the plow blade member.

15. Apparatus as specified in claim 12 in which first heat sealing jaws comprises two cooperating jaw members pivotally mounted to rotate during opening and closing thereof in direction approximately 90° away from the direction of the path of rotation of the drum.

16. Apparatus for forming a closure in one end portion of a bag tube of the type having top and bottom walls and gusseted side walls with seat sealable material positioned in portions of said one end of the bag tube in which at least one wall of the tube in such end portion is slit to form a flap which comprises:
- (a) a first drum for moving the bag tube in one direction
- (b) means associated with such drum for separating the top and bottom walls in said end portion of the tube and to fold the opposite gusset walls inwardly over said top and bottom walls to bring portions of said gusseted walls into overlapping relationship with inner portions of said top and bottom walls and to bring opposite end portions of said gusseted walls into face to face contact to form a longitudinal fin in said end portion of the bag tube
- (c) a second drum for moving the bag tube in a second direction
- (d) jaws mounted on said second drum which grip the longitudinal fin to apply heat and pressure for sealing the thermoplastic material in the fin and to move the bag in said second direction
- (e) a third drum for moving the bag tube in said one direction
- (f) gripping means mounted on said third drum which grip the bag tube and move it in said one direction
- (g) jaws mounted on said third drum for gripping the bag tube across opposite ends of said longitudinal fin
- (h) tucking blades for tucking a portion of the bag tube down in between said jaws on the third drum
- (i) means for closing the jaws on the tucks of bag tube to grip the tuck and cause the end portions of the top and bottom walls of the bag tube to stand upright above the surface of the drum
- (j) a fourth drum for moving the bag tube in said second direction
- (k) jaws mounted on said fourth drum which grip the upstanding end portions of said top and bottom walls to apply heat and pressure for sealing the thermoplastic material in gusseted walls to the thermoplastic material in the end portion of the top and bottom walls and to move the bag tube in said second direction
- (l) means for folding the end portions of said top and bottom walls inwardly over the fin and for pasting them in place to complete the end closure.

17. In the manufacture of paper bags of the type having a heat fusible liner adapted to be sealed by heat and pressure the combination which comprises a rotating drum, a pair of heat sealing jaw members positioned on such drum with the plane of the mating surfaces of said cooperating jaw members forming an angle of approximately ninety degrees with the axis of rotation of the drum.

18. A structure as specified in claim 17 in which the jaw members are pivotally mounted on an undercarriage which is in turn pivotally mounted on the drum and which includes means for pivoting the undercarriage to tilt one end portion of the jaw members when closed toward and away from the periphery of the drum.

19. In the manufacture of paper bags of the type having a heat fusible liner adapted to be sealed by heat and pressure in which the bag tube has top and bottom walls separated by a gusset at each side and in which the end closure for the bag is formed by separating the top and bottom walls in one end portion of the bag tube and folding the gusset walls inwardly over the top and bottom walls to form oppositely disposed end flaps the combination which comprises a rotating drum, a pair of spaced clamping jaws in position on said drum to clamp the oppositely disposed end flaps, a blade member for tucking a portion of such end flaps down in between each of the jaws and means for closing the jaws to clamp the tucked portion of the end flaps to cause the remaining portion of the end flaps to stand upright above the level of the clamping jaws.

20. In the manufacture of paper bags of the type having a top and bottom wall separated by a gusset at each side with heat fusible liner adapted to be sealed by heat and pressure positioned at the inner surface of the tube the combination which comprises means for slitting one end portion of the top and bottom walls of the tube to form a flap in each of said walls, a gripper for holding one of said flaps, second grippers for separating the top and bottom walls in said end portion to form an open box with upstanding walls while the said one flap is held down, a stationary plow blade located in position to enter the open box, means for advancing the bag tube in the direction of its length to move both of said flaps under the plow blade and to position the side walls of the box adjacent opposite sides of said plow blade, means for folding the side walls of the box in against the plow blade member with inner opposite end portions of said side walls being positioned upright against opposite sides of said plow blade member to form a longitudinal fin in said one end portion of the bag tube.

References Cited in the file of this patent

UNITED STATES PATENTS

| | | |
|---|---|---|
| 1,058,806 | Stilwell | Apr. 15, 1913 |
| 2,126,920 | Potdevin | Aug. 16, 1938 |
| 2,353,402 | Haslacher | July 11, 1944 |
| 2,732,774 | Housel | Jan. 31, 1956 |
| 2,773,435 | Richens | Dec. 11, 1956 |
| 3,028,294 | Histed | Apr. 3, 1962 |

FOREIGN PATENTS

| | | |
|---|---|---|
| 784,932 | Great Britain | Oct. 23, 1957 |